United States Patent
Inatomi et al.

(10) Patent No.: US 7,796,776 B2
(45) Date of Patent: Sep. 14, 2010

(54) DIGITAL IMAGE PICKUP DEVICE, DISPLAY DEVICE, RIGHTS INFORMATION SERVER, DIGITAL IMAGE MANAGEMENT SYSTEM AND METHOD USING THE SAME

(75) Inventors: Yasuaki Inatomi, Kanagawa-ken (JP); Toru Nakada, Kanagawa-ken (JP); Yoshiaki Tomioka, Chiba-ken (JP)

(73) Assignee: Panasonic Corporation, Osaka (JP)

( * ) Notice: Subject to any disclaimer, the term of this patent is extended or adjusted under 35 U.S.C. 154(b) by 1020 days.

(21) Appl. No.: 10/594,981

(22) PCT Filed: Mar. 28, 2005

(86) PCT No.: PCT/JP2005/005723
§ 371 (c)(1), (2), (4) Date: Sep. 29, 2006

(87) PCT Pub. No.: WO2005/094064
PCT Pub. Date: Oct. 6, 2005

(65) Prior Publication Data
US 2007/0217680 A1 Sep. 20, 2007

(30) Foreign Application Priority Data
Mar. 29, 2004 (JP) ............................. 2004-095374

(51) Int. Cl.
*G06K 9/00* (2006.01)
*H04N 1/40* (2006.01)

(52) U.S. Cl. ..................................... 382/100; 358/3.28

(58) Field of Classification Search ...................... None
See application file for complete search history.

(56) References Cited

U.S. PATENT DOCUMENTS

| 5,764,770 | A | 6/1998 | Schipper et al. |
| 2002/0039479 | A1 | 4/2002 | Watanabe et al. |
| 2004/0123131 | A1* | 6/2004 | Zacks et al. ................. 713/200 |
| 2006/0203104 | A1* | 9/2006 | Vau et al. ................. 348/231.3 |

FOREIGN PATENT DOCUMENTS

| JP | 2000-341634 | 12/2000 |
| JP | 2002-142181 A | 5/2002 |
| JP | 2003-324642 | 11/2003 |

OTHER PUBLICATIONS

Japanese Search Report for Application No. PCT/JP2005/005723, dated Jul. 26, 2005, with English translation thereof.

* cited by examiner

*Primary Examiner*—Charles Kim
(74) *Attorney, Agent, or Firm*—RatnerPrestia

(57) ABSTRACT

A digital image pickup device is provided with an input unit that inputs a photographed digital image, a predetermined information detector that detects predetermined information, a predetermined information embedding unit that embeds the detected predetermined information in the digital image and a browse restriction applying unit that executes a process for applying browse restriction to the digital image in which the predetermined information is embedded.

8 Claims, 20 Drawing Sheets

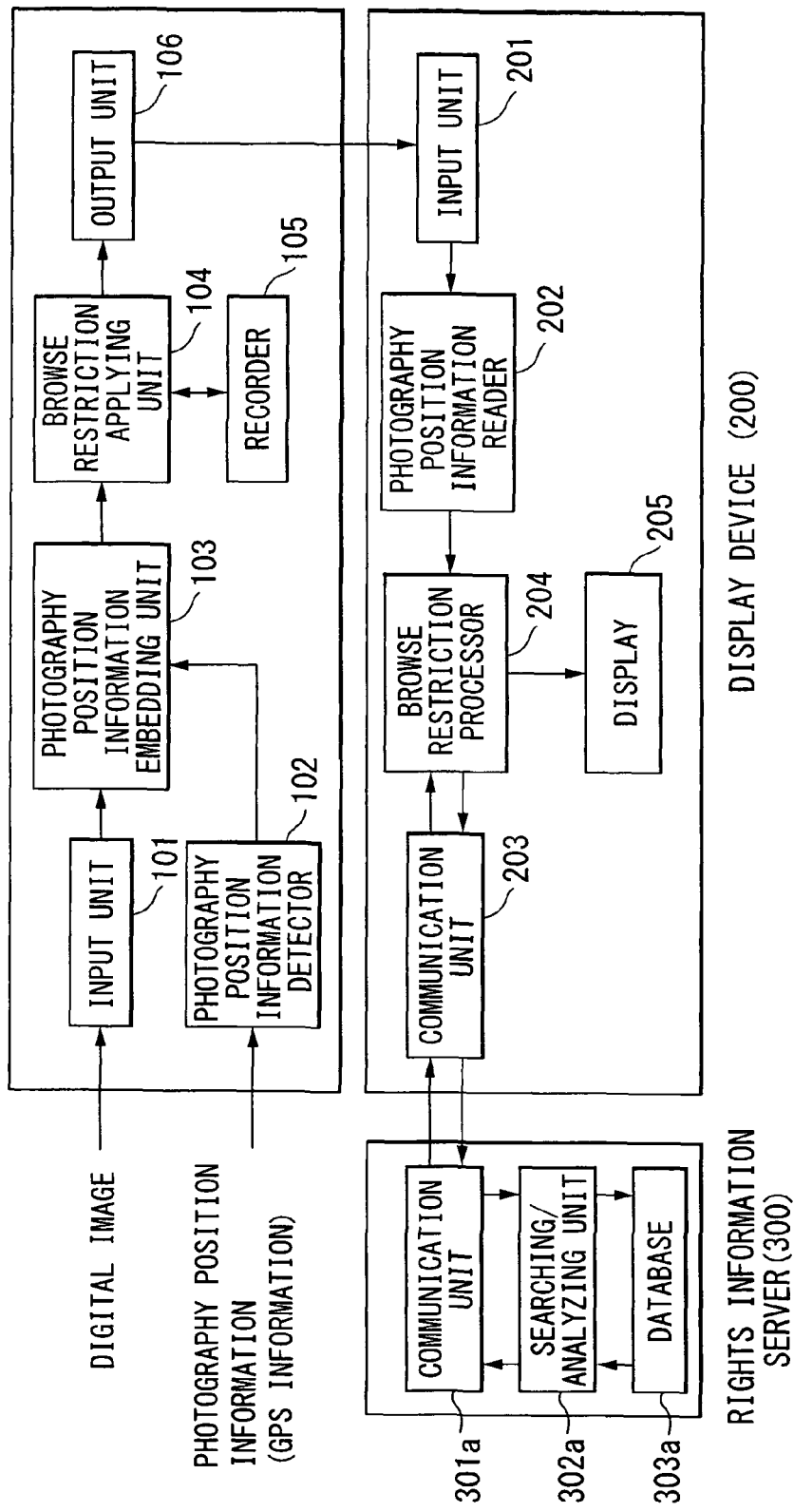

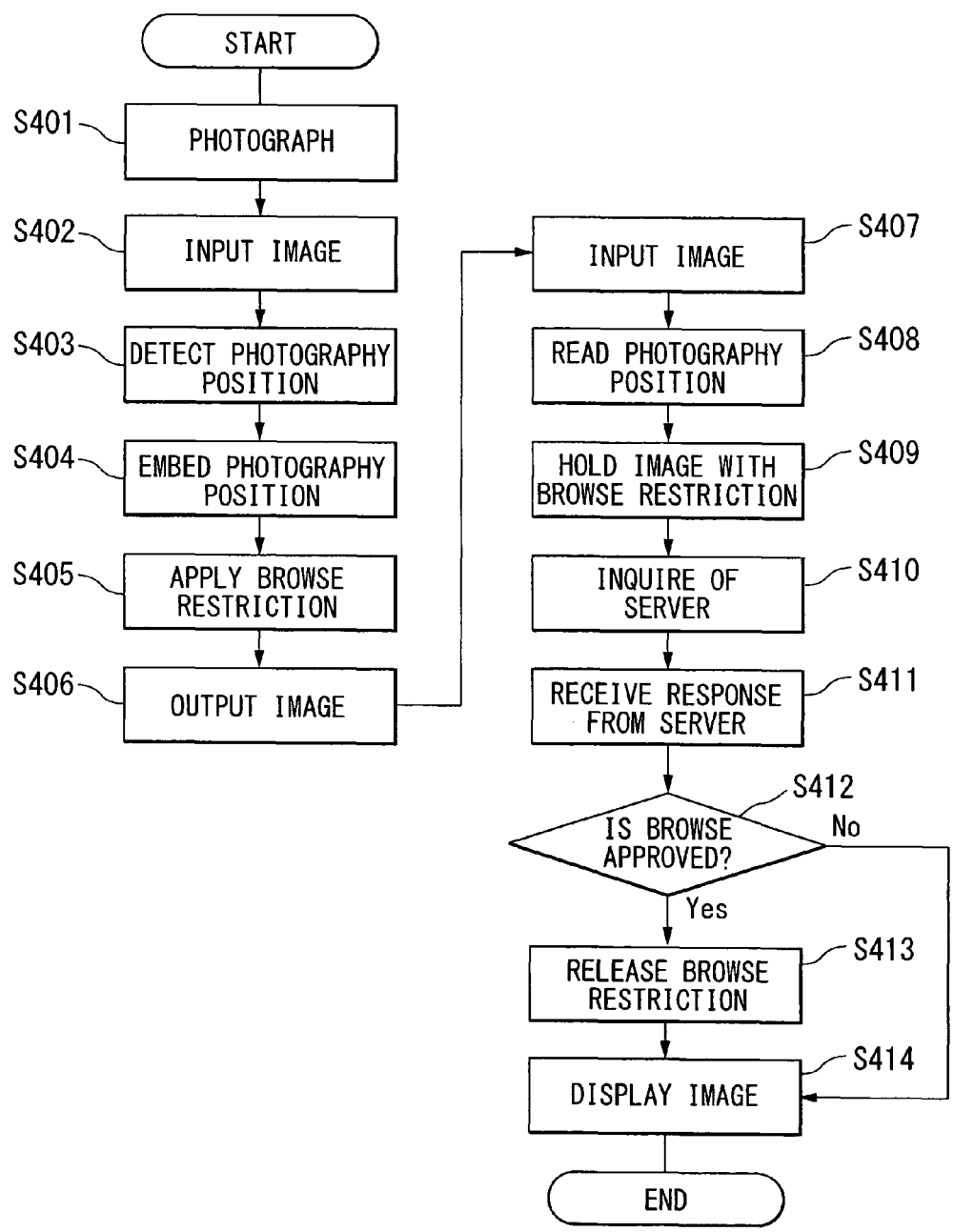

FIG. 3

| POSITIONAL INFORMATION (LATITUDE:LONGITUDE) | RIGHTS INFORMATION | DECODING KEY |
|---|---|---|
| a°,a',a":A°,A',A" (○○ DOME) | BROWSE IS APPROVED | GENERATE BASED UPON FIXED INFORMATION |
| b°,b',b":B°,B',B" (△△ ARENA) | BROWSE IS APPROVED | GENERATE BASED UPON POSITIONAL INFORMATION |
| c°,c',c":C°,C',C" (□□ AMUSEMENT PARK) | BROWSE IS APPROVED | GENERATE BASED UPON POSITIONAL INFORMATION |
| d°,d',d":D°,D',D" (×× DOME) | BROWSE IS APPROVED | GENERATE BASED UPON FIXED INFORMATION |

BROWSE RESTRICTION DETERMINATION TABLE

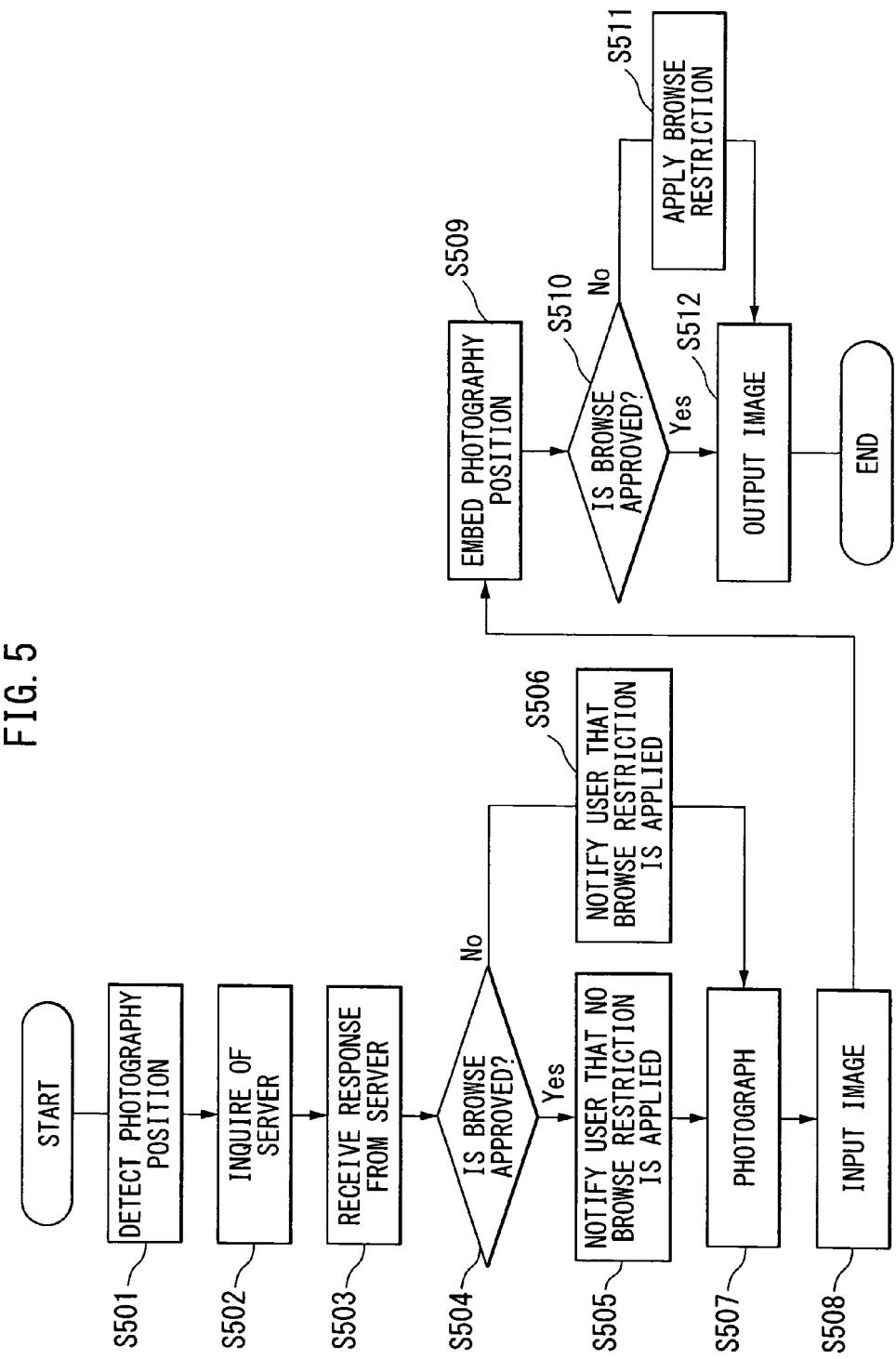

FIG. 6

| POSITIONAL INFORMATION (LATITUDE:LONGITUDE) | RIGHTS INFORMATION | CIPHER SYSTEM |
|---|---|---|
| a°,a',a":A°,A',A" (○○ DOME) | BROWSE IS DISAPPROVED | FIXED INFORMATION |
| b°,b',b":B°,B',B" (△△ ARENA) | BROWSE IS DISAPPROVED | PHOTOGRAPHER POSITIONAL INFORMATION |
| c°,c',c":C°,C',C" (□□ AMUSEMENT PARK) | BROWSE IS DISAPPROVED | OBJECT POSITIONAL INFORMATION |
| d°,d',d":D°,D',D" (×× DOME) | BROWSE IS DISAPPROVED | FIXED INFORMATION |

BROWSE RESTRICTION DETERMINATION TABLE

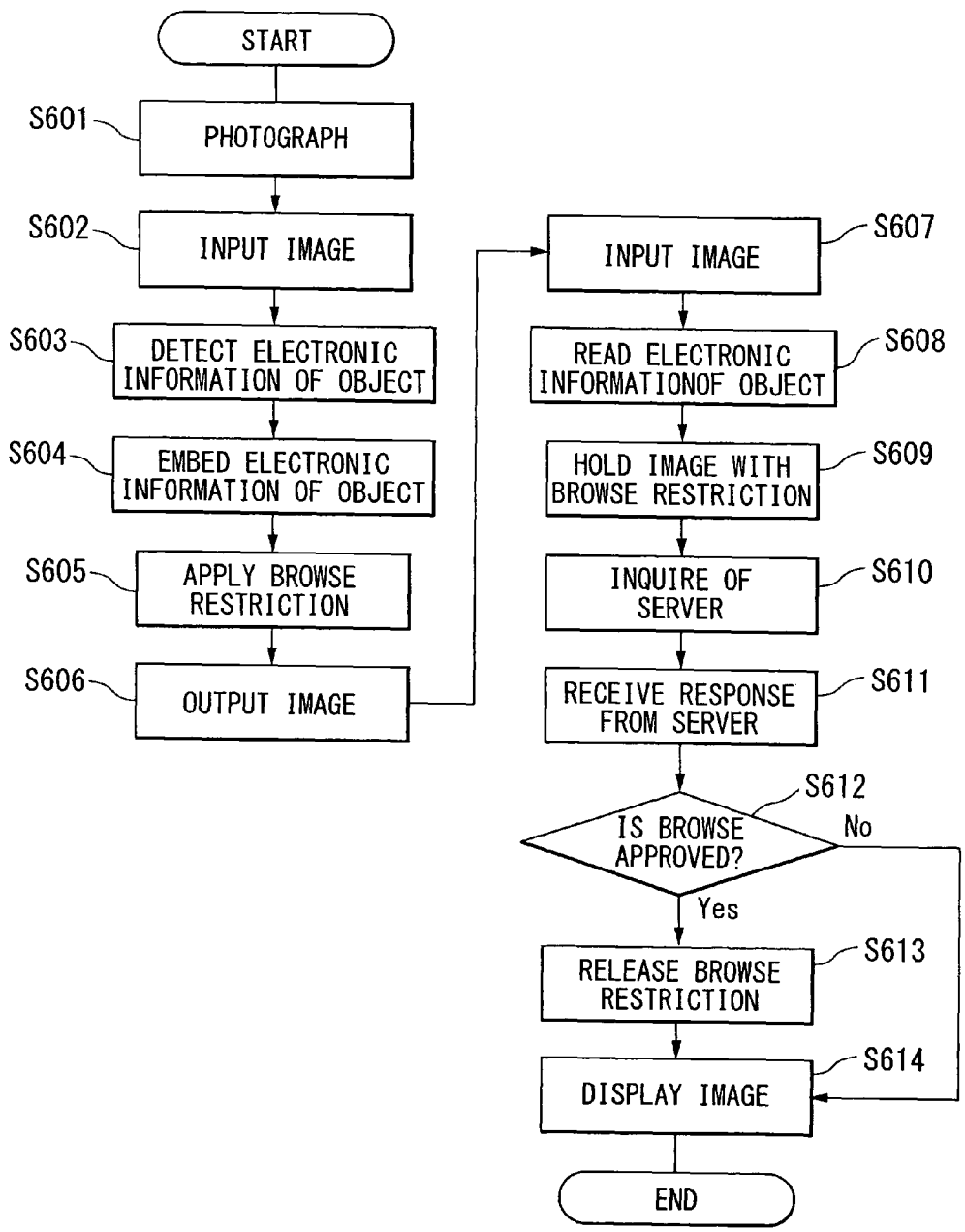

FIG. 9

| OBJECT ELECTRONIC INFORMATION | RIGHTS INFORMATION | DECODING KEY |
|---|---|---|
| ×11 | BROWSE IS APPROVED | GENERATE BASED UPON FIXED INFORMATION |
| ×22 | BROWSE IS APPROVED | GENERATE BASED UPON OBJECT ELECTRONIC INFORMATION |
| ×33 | BROWSE IS APPROVED | GENERATE BASED UPON OBJECT ELECTRONIC INFORMATION |
| ×44 | BROWSE IS APPROVED | GENERATE BASED UPON FIXED INFORMATION |

BROWSE RESTRICTION DETERMINATION TABLE

FIG. 12

| OBJECT ELECTRONIC INFORMATION | RIGHTS INFORMATION | CIPHER SYSTEM |
|---|---|---|
| ×11 | BROWSE IS DISAPPROVED | FIXED INFORMATION |
| ×22 | BROWSE IS DISAPPROVED | PHOTOGRAPHER POSITIONAL INFORMATION |
| ×33 | BROWSE IS DISAPPROVED | OBJECT POSITIONAL INFORMATION |
| ×44 | BROWSE IS DISAPPROVED | FIXED INFORMATION |

BROWSE RESTRICTION DETERMINATION TABLE

FIG. 13
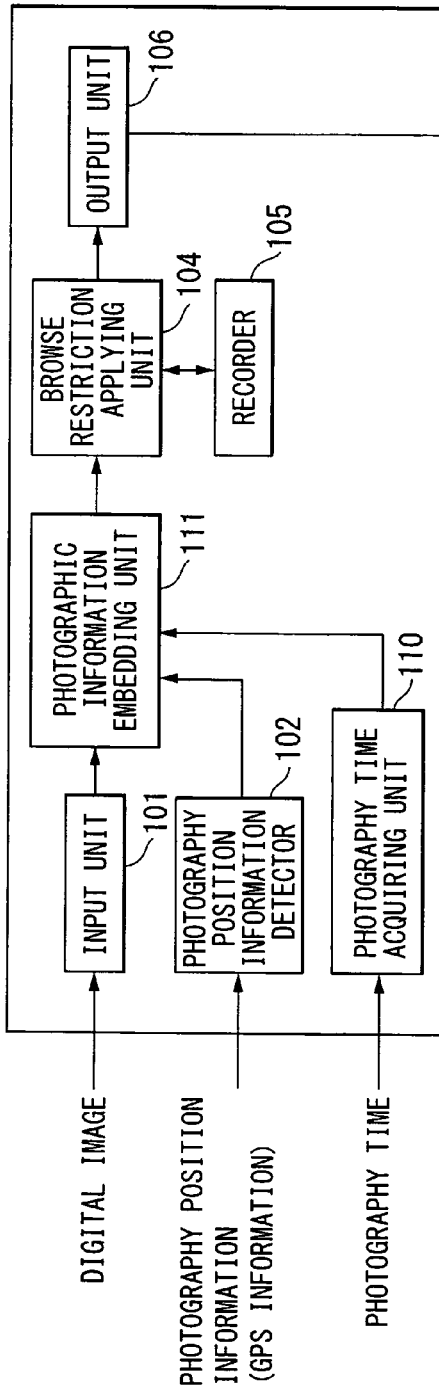
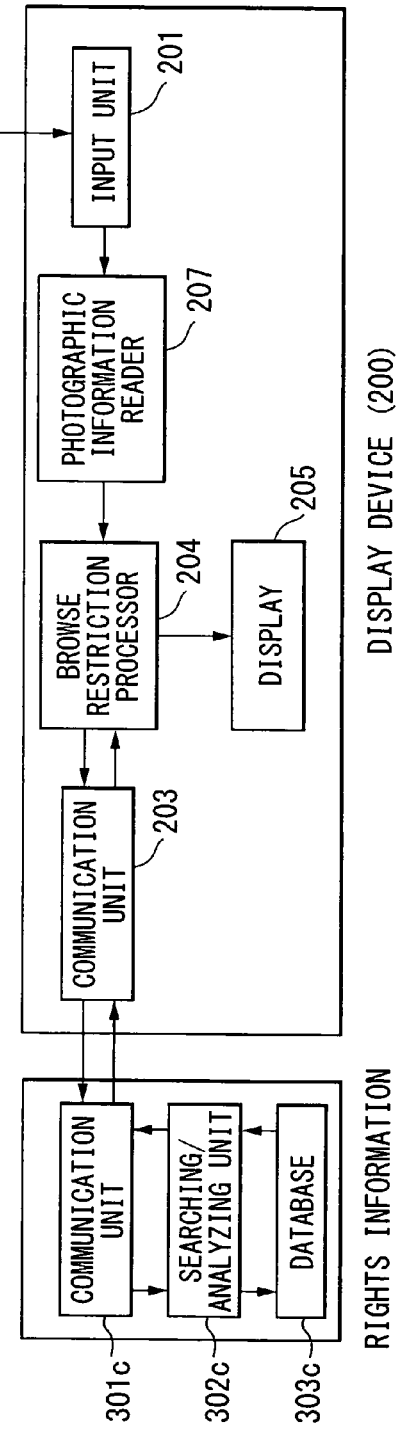

FIG. 15

| POSITIONAL INFORMATION (LATITUDE:LONGITUDE) | TIME INFORMATION | RIGHTS INFORMATION | DECODING KEY |
|---|---|---|---|
| a°,a',a":A°,A',A" (○○ DOME) | 10:00~16:00 | BROWSE IS APPROVED | GENERATE BASED UPON FIXED INFORMATION |
| b°,b',b":B°,B',B" (△△ ARENA) | 12:00~18:30 | BROWSE IS APPROVED | GENERATE BASED UPON POSITIONAL INFORMATION |
| c°,c',c":C°,C',C" (□□ AMUSEMENT PARK) | 16:00~18:30 | BROWSE IS APPROVED | GENERATE BASED UPON POSITIONAL INFORMATION |
| d°,d',d":D°,D',D" (×× DOME) | 18:00~23:00 | BROWSE IS APPROVED | GENERATE BASED UPON FIXED INFORMATION |

BROWSE RESTRICTION DETERMINATION TABLE

FIG. 18

| POSITIONAL INFORMATION (LATITUDE:LONGITUDE) | RIGHTS INFORMATION | CIPHER SYSTEM | ENCRYPTION INTENSITY |
|---|---|---|---|
| a°,a',a":A°,A',A"(○○ DOME) | BROWSE IS DISAPPROVED | FIXED INFORMATION | 1 |
| b°,b',b":B°,B',B"(△△ ARENA) | BROWSE IS DISAPPROVED | PHOTOGRAPHER POSITIONAL INFORMATION | 5 |
| c°,c',c":C°,C',C"(□□ AMUSEMENT PARK) | | OBJECT POSITIONAL INFORMATION | 0 |
| d°,d',d":D°,D',D"(×× DOME) | BROWSE IS DISAPPROVED | FIXED INFORMATION | 3 |

BROWSE RESTRICTION DETERMINATION TABLE

DIGITAL IMAGE PICKUP DEVICE, DISPLAY DEVICE, RIGHTS INFORMATION SERVER, DIGITAL IMAGE MANAGEMENT SYSTEM AND METHOD USING THE SAME

This application is a U.S. National Phase Application of PCT International Application PCT/JP2005/005723.

FIELD OF THE INVENTION

The present invention relates to a digital image pickup device that applies browse restriction to a photographed digital image and enables displaying the digital image only when the browse is permitted.

BACKGROUND OF THE INVENTION

Recently, according to the development of a digital image pickup device, a mobile telephone, computer technology, the Internet, electronic mail and others, the exchange and the distribution of a digital image have been simplified and have been widely utilized. As well known, a digital image photographed by a digital image pickup device can be shared on the Internet utilizing a personal computer and others and can be browsed by anybody only if he/she connects his/her personal computer to the Internet.

A digital image pickup function of one million pixels or more is often mounted in a mobile telephone. A photographed digital image can be transmitted with the digital image attached to electronic mail as it is as image data and a person who receives the electronic mail with the photographed digital image can browse the digital image. A digital image photographed by a digital image pickup device and a mobile telephone in which its function is mounted not only can be browsed by a family and friends but can be shared among users of the Internet without limitation, and has an advantage that the digital image can be simply browsed. A digital image also has an advantage that it can be simply edited. As described above, a digital image has many advantages that the photography, the sharing and the edition are simple. However, it also has the following problems.

For example, in a museum and a concert hall, there is a problem that photography is simply enabled using a digital image pickup device and a mobile telephone provided with its function even if photography is prohibited in the location. There is also a problem that the photography of an image related to the privacy of an individual is not limited and a portrait right and copyrights are not protected at all. A crime such as taking a snapshot stealthily and a problem that a snapshot of another person is edited without notice and is distributed to the public are also increasing. The solution of these problems is currently left to the morals of individuals or only means such as check by a person disclosed in JP-A-2000-341634 is adopted.

SUMMARY OF THE INVENTION

In view of such problems, the object of the invention is to provide a digital image pickup device that executes a process for applying browse restriction to a photographed digital image, a display device that displays the photographed digital image only when the browse is not limited and a rights information server that manages rights information of whether browse restriction is applied or not, and is also to provide a digital image management system using them and its method.

The digital image pickup device according to the invention is characterized in that it is provided with an input unit that inputs a photographed digital image, a predetermined information detector that detects predetermined information, a predetermined information embedding unit that embeds the detected predetermined information in the digital image and a browse restriction applying unit that executes a process for applying browse restriction to the digital image in which the predetermined information is embedded.

The display device according to the invention is characterized in that it is provided with an input unit inputs the digital image which is output from the digital image pickup device, in which the predetermined information is embedded and to which browse restriction is applied, a predetermined information reader that reads the predetermined information, a communication unit that inquires whether browse restriction can be released or not based upon the read predetermined information and acquires browse restriction information which is a result of the analysis and a browse restriction processor that once holds the digital image and executes a process for releasing browse restriction according to the browse restriction information acquired from the communication unit.

Besides, the digital image pickup device according to the invention is characterized in that it is provided with a communication unit that inquires whether browse restriction is applied or not based upon detected predetermined information and acquires browse restriction information which is a result of the analysis and the browse restriction applying unit executes a process for applying browse restriction according to the browse restriction information acquired from the communication unit.

The rights information server according to the invention is characterized in that it is provided with a database that manages a browse restriction determination table for determining whether browse restriction is applied or not, a searching/analyzing unit that analyzes whether browse restriction can be released or not based upon the predetermined information input from the display device referring to the browse restriction determination table and acquires browse restriction information which is a result of the analysis and a communication unit that transmits the browse restriction information to the display device that transmits the predetermined information.

According to the invention, a process for detecting predetermined information, embedding this in a photographed digital image and applying browse restriction is executed in photographing the image digitally and a process for acquiring browse restriction information which is a result of analyzing the predetermined information and releasing browse restriction according to the browse restriction information is executed in browsing. Thus, the digital image photographed on a condition that browse restriction is applied is displayed in a state in which browse restriction is not released and in the meantime, the browse restriction of the digital image photographed on a condition that no browse restriction is applied is released and the photographed digital image can be displayed. As a result, the above-mentioned problems which the conventional type digital image pickup devices have can be solved.

Besides, according to the invention, a process for detecting predetermined information, acquiring browse restriction information showing whether browse restriction is applied or not based upon the detected predetermined information and applying browse restriction according to the browse restriction information is executed in photographing an image digitally. Thus, browse restriction is applied to the digital image photographed on a condition that the browse restriction is applied and the digital image is displayed. In the meantime, no browse restriction is applied to the digital image photographed on a condition that no browse restriction is applied and the digital image is displayed. As a result, the abovementioned problems which the conventional type digital image pickup devices have can be solved.

BRIEF DESCRIPTION OF THE DRAWINGS

FIG. 1 shows the internal configuration of a digital image management system according to the invention and each block (a first embodiment);

FIG. 2 shows a flow of a process in the digital image management system according to the invention (the first embodiment);

FIG. 3 shows a browse restriction determination table (the first embodiment);

FIG. 5 shows a flow of a process in the digital image management system according to the invention (the second embodiment);

FIG. 6 shows a browse restriction determination table (the second embodiment);

FIG. 8 shows a flow of a process in the digital image management system according to the invention (the third embodiment);

FIG. 9 shows a browse restriction determination table (the third embodiment);

FIG. 12 shows a browse restriction determination table (the fourth embodiment);

FIG. 13 shows the internal configuration of a digital image management system according to the invention and each block (a fifth embodiment);

FIG. 15 shows a browse restriction determination table (the fifth embodiment);

FIG. 18 shows a browse restriction determination table (the sixth embodiment);

DETAILED DESCRIPTION OF THE PREFERRED EMBODIMENTS

Figure 4:
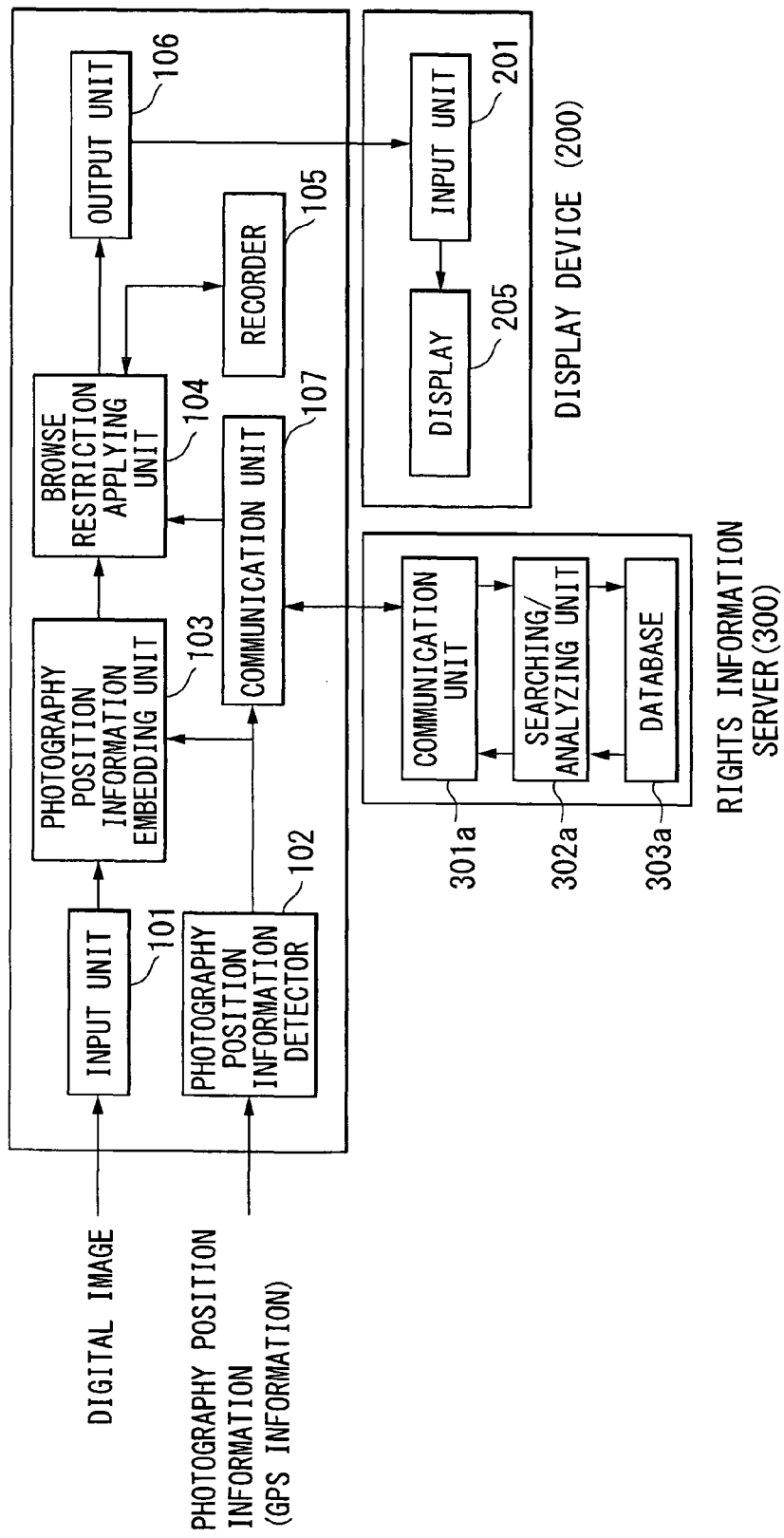
FIG. 4 shows the internal configuration of a digital image management system according to the invention and each block (a second embodiment)

Each best embodiment for embodying the invention will be described in detail below. The invention is not limited to a scope described in the following each embodiment and may be suitably changed in a range that does not deviate from the point.

First Embodiment

Referring to FIGS. 1 to 3, a first embodiment of the invention will be described below. In this embodiment, a process for detecting positional information of a photographer, embedding this in a photographed digital image and applying browse restriction is executed in photographing an image digitally and a process for transmitting the positional information of the photographer to a rights information server, inquiring whether browse restriction can be released or not, acquiring browse restriction information which is the result of analysis from the rights information server and releasing the browse restriction according to the information is executed in browsing. A digital image management system in this embodiment includes a digital image pickup device 100, a display device 200 and the rights information server 300.

The digital image pickup device 100 can photograph a digital static image or a digital dynamic image and includes a digital camera and a mobile telephone provided with its function. The digital image pickup device 100 is provided with an input unit 101, a photography position information detector 102, a photography position information embedding unit 103, a browse restriction applying unit 104, a recorder 105 and an output unit 106. The display device 200 displays a digital static image or a digital dynamic image on a screen and includes a display mounted in a mobile telephone and a digital camera. The display device 200 is provided with an input unit 201, a photography position information reader 202, a communication unit 203, a browse restriction processor 204 and a display 205. The rights information server 300 manages positional information and the rights information of whether browse restriction can be released or not with both information related and exists on a network such as the Internet. The rights information server 300 is provided with a communication unit 301a, a searching/analyzing unit 302a and a database 303a.

The operation of the digital image management system will be described below. First, when a photographer takes a picture by the digital image pickup device 100 (S401), the input unit 101 inputs a photographed digital image (S402) and the photography position information detector 102 detects the positional information of the photographer (S403). For the positional information of the photographer, global positioning system (GPS) information showing a position of the photographer using longitude and latitude is used and a GPS receiver is used for detecting the GPS information. Next, the photographed digital image and the detected positional information of the photographer are input to the photography position information embedding unit 103 and the photography position information embedding unit embeds the positional information of the photographer in the digital image (S404). Embedding the positional information in the digital image prevents falsification by a user, and digital watermarking is utilized for guaranteeing the reliability of embedded positional information. The reliability of the embedded positional information is guaranteed by a digital signature function not shown. The digital image in which the positional information of the photographer is embedded is input to the browse restriction applying unit 104 and the browse restriction applying unit 104 applies browse restriction by applying an encryption process such as a mosaic, shading and cutting to the whole or a part of the digital image in which the positional information is embedded (S405). A cipher system has only to be able to restore the original photographed image by a key and is not particularly limited. In this embodiment, digital watermarking is utilized. For the cipher system, there are a mode in which encryption is made based upon fixed information and a mode in which encryption is made based upon detected positional information of a photographer and these depend upon a mode for operating the system. In this embodiment, the embodiment based upon fixed information is adopted and the encryption process is executed using fixed information. Afterward, the digital image to which browse restriction is applied is output to the recorder 105 and the output unit 106 (S406). The recorder 105 has a built-in type and a detachable type. The output unit 106 outputs a digital image to the display device 200 and when the digital image is output, the output unit 106 and the display device 200 are connected via wire or by radio.

When an image photographed by the digital image pickup device 100 is displayed, the digital image to which browse restriction is applied is input from the output unit 106 to the input unit 201 of the display device 200 (S407). When the digital image to which browse restriction is applied is recorded in the detachable recorder 105, the digital image is directly input to the input unit 201. Next, the digital image input to the input unit 201 is input to the photography position information reader 202 and the photography position information reader 202 reads the positional information of the photographer embedded by the digital image pickup device 100 (S408). In this embodiment, the positional information is read using digital watermarking reading software and others. The digital image to which browse restriction is applied is input to the browse restriction processor 204 together with the read positional information of the photographer, the browse restriction processor 204 once holds the image (S409) and in the meantime, transmits the positional information of the photographer to the communication unit 203. The communication unit 203 communicates with the rights information server 300, transmits the positional information of the photographer, and inquires whether browse restriction can be released or not (S410).

The communication unit 301*a* of the rights information server 300 acquires the positional information of the photographer and transmits it to the searching/analyzing unit 302*a*. The searching/analyzing unit 302*a* searches whether browse restriction can be released or not based upon the input positional information of the photographer referring to a browse restriction determination table managed in the database 303*a*, acquires browse restriction information which is the result of analysis, and transmits it to the communication unit 301*a*. It is premised that the browse restriction determination table managed in the database 303*a* is highly reliable. As shown in FIG. 3, the browse restriction determination table manages positional information and rights information of whether browse restriction can be released or not with both information related and also manages a decoding key that can release browse restriction with the decoding key related to positional information denoting the approval of a browse. For example, when this system adopts the embodiment in which encryption is made based upon fixed information, the digital image pickup device 100 executes the encryption process using fixed information. As "a°,a',a":A°,A',A" (OO dome)" including the corresponding positional information exists in the browse restriction determination table when the positional information of the photographer input to the searching/analyzing unit 302*a* is "a°,a',a.x":A a°,A',A.x'"", it is analyzed that rights information corresponding to the corresponding positional information denotes the approval of a browse, browse restriction information showing that browse restriction can be released is acquired, a decoding key generated based upon fixed information managed with the decoding key and the fixed information related is acquired, and these are input to the communication unit 301*a*. In the meantime, as no information including the corresponding positional information exists in the browse restriction determination table when the positional information of the photographer input to the searching/analyzing unit 302*a* is "a°,a',b.x":A a°,A',B.x'"", it is analyzed that rights information corresponding to the corresponding positional information denotes the disapproval of a browse, browse restriction information showing that browse restriction cannot be released is acquired, and this is input to the communication unit 301*a*. In this case, no decoding key can be acquired.

Afterward, the communication unit 301*a* transmits the browse restriction information to the communication unit 203 of the display device 200 (S411) and the communication unit 203 transmits this to the browse restriction processor 204. The browse restriction processor 204 applies a process for releasing browse restriction to the digital image to which browse restriction is applied and which is once held according to the input browse restriction information and displays the image on the display 205 after the process. That is, when the browse restriction information showing that browse restriction can be released is input, the process for releasing browse restriction using the decoding key input together with the corresponding information is executed (S412→S413) and after the process, the photographed digital image is displayed on the display 205 (S414). In the meantime, when the browse restriction information showing that browse restriction cannot be released is input, the browse restriction is not released and the digital image to which the browse restriction is applied is displayed on the display 205 (S412→S414).

According to this embodiment, the process for detecting the positional information of the photographer in photographing, embedding this in the photographed digital image and applying browse restriction to the digital image is executed and the process for transmitting the positional information of the photographer to the rights information server in browsing, inquiring whether browse restriction can be released or not, acquiring browse restriction information which is the result of analysis from the rights information server and releasing the browse restriction according to the browse restriction information is executed. Thus, the photographed digital image can be browsed only when the information showing that browse restriction can be released is acquired and the above-mentioned problems which the conventional type digital image pickup devices have can be solved.

Even if the information showing that browse restriction cannot be released is acquired by the display device, the decoding key that can release browse restriction may also be acquired by accounting between the display device and the rights information server.

In this embodiment, the photography position information detector detects the positional information of the photographer, embeds this in a digital image, and inquires the rights information server of the positional information of the photographer. However, it may also be arranged such that the photography position information detector detects the positional information of an object, embeds this in a digital image, and inquires the rights information server of the positional information of the corresponding object. The positional information of the object can be detected by detecting distance from the object using a focusing function (not shown) provided to the digital image pickup device and by using an inclination sensor (not shown) function of a camera and an angle of view which is a characteristic of a lens.

Besides, in this embodiment, the encryption process is executed using fixed information, however, this process is different depending upon a mode for operating the system and there are modes using positional information of a photographer and positional information of an object. In the embodiment using the positional information of the photographer, browse restriction is encrypted using the positional information of the photographer and in the meantime, the browse restriction determination table managed by the rights information server manages the decoding key generated using the positional information denoting the approval of a browse. Further, in the embodiment using the positional information of the object, browse restriction is encrypted using the positional information of the object and in the meantime, the browse restriction determination table managed by the rights information server manages the decoding key generated using the positional information denoting the approval of a browse.

Second Embodiment

Referring to FIGS. 4 to 6, a second embodiment of the invention will be described below. In this embodiment, a process for detecting positional information of a photographer, transmitting this to a rights information server, inquiring whether browse restriction is applied to a digital image photographed in the corresponding position or not, acquiring browse restriction information which is the result of analysis from the rights information server and applying browse restriction according to the browse restriction information is executed before photographing an image digitally. A digital image management system in this embodiment includes a digital image pickup device 100, a display device 200 and the rights information server 300.

The digital image pickup device 100 is provided with the input unit 101, the photography position information detector 102, the photography position information embedding unit 103, the browse restriction applying unit 104, the recorder 105, the output unit 106 and a communication unit 107. The display device 200 is provided with the input unit 201 and the display 205. The rights information server 300 is provided with a communication unit 301a, a searching/analyzing unit 302a and a database 303a.

The operation of the digital image management system will be described below. First, the photography position information detector 102 detects positional information of a photographer according to the operation of the photographer (S501). For the positional information of the photographer, global positioning system (GPS) information representing a position of the photographer by longitude and latitude is used and a GPS receiver is used for detecting the GPS information. The detected positional information of the photographer is transmitted to the communication unit 107, the communication unit 107 communicates with the rights information server 300, transmits the positional information of the photographer, and inquires whether browse restriction is applied or not (S502). The communication unit 301a of the rights information server 300 acquires the positional information of the photographer and transmits this to the searching/analyzing unit 302a. The searching/analyzing unit 302a searches a browse restriction determination table managed in the database 303a based upon the input positional information of the photographer, searches whether browse restriction is applied or not, acquires browse restriction information which is the result of analysis, and transmits the browse restriction information to the communication unit 301a. For example, since "a°,a',a":A°,A',A" (OO dome)" including the corresponding positional information exists in the browse restriction determination table shown in FIG. 6 when the positional information of the photographer input to the searching/analyzing unit 302a is "a°,a',a.x":A°,A',A.x'", it is analyzed that rights information corresponding to the corresponding positional information denotes the disapproval of a browse, browse restriction information showing that browse restriction is applied is acquired, a cipher system showing that encryption is made based upon fixed information managed with the fixed information related to the browse restriction information is acquired, and these are input to the communication unit 301a. It is premised that the browse restriction determination table managed in the database 303a is highly reliable. The cipher system has only to be able to restore the original photographed image by a key and is not particularly limited. In this embodiment, digital watermarking is utilized. A cipher system has a mode in which encryption is made based upon fixed information and a mode in which encryption is made based upon detected positional information of a photographer and these are determined by a cipher system defined in the browse restriction determination table. In the meantime, since no information including the corresponding positional information exists in the browse restriction determination table when the positional information of the photographer input to the searching/analyzing unit 302a is "a°,a',b.x":A°,A',B.x'", it is analyzed that rights information corresponding to the corresponding positional information denotes the approval of a browse, browse restriction information showing that no browse restriction is applied is acquired, and this is input to the communication unit 301a. In this case, no cipher system is acquired.

Afterward, the communication unit 301a transmits the browse restriction information to the communication unit 107 (S503) and the communication unit 107 transmits it to the browse restriction applying unit 104. The photographer can verify the browse restriction information acquired from the rights information server 300 and can verify that no browse restriction is applied (S504→S505) and that browse restriction is applied (S504→S506). The browse restriction applying unit 104 manages the positional information of the photographer detected by the photography position information detector 102 and the input browse restriction information with both information related.

Next, when the photographer takes a picture by the digital image pickup device 100 (S507), a photographed digital image is input to the input unit 101 (S508), the photographed digital image and the positional information detected in the step 501 of the photographer are input to the photography position information embedding unit 103, and the positional information of the photographer is embedded in the digital image (S509). The positional information is embedded in the digital image to prevent falsification by a user and digital watermarking is utilized for guaranteeing the reliability of the embedded positional information. The reliability of the embedded positional information is guaranteed by a digital signature function not shown. The digital image in which the positional information of the photographer is embedded is input to the browse restriction applying unit 104, the browse restriction applying unit 104 acquires browse restriction information managed with the browse restriction information related to the positional information based upon the positional information embedded in the digital image, and executes a process for applying browse restriction to the digital image according to the browse restriction information. That is, when browse restriction information showing that browse restriction is applied is input (S510→S511), browse restriction is applied by applying an encryption process such as a mosaic, shading and cutting to the whole or a part of the digital image according to a cipher system acquired together with the browse restriction information. In the meantime, when browse restriction information showing that no browse restriction is applied is input, no encryption process is applied to the digital image. After the process for applying browse restriction is executed according to the browse restriction information, the digital image is output to the recorder 105 and the output unit 106 (S512). The recorder 105 has a built-in type and a detachable type. The output unit 106 outputs the digital image to the display device 200 and when the output unit outputs the digital image, the output unit 106 and the display device 200 are connected via wire or by radio. The digital image processed in relation to browse restriction in the digital image pickup device 100 is input from the recorder 105 or the output unit 106 to the input unit 201 of the display device 200 and can be browsed by displaying this on the display 105.

According to this embodiment, the process for detecting the positional information of the photographer before photographing the image digitally, transmitting this to the rights information server, inquiring whether or not browse restriction is applied based upon the photography position information, acquiring browse restriction information which is the result of analysis from the rights information server and applying browse restriction according to the browse restriction information is executed, and since browse restriction is applied to the photographed digital image when browse restriction information showing that browse restriction is applied is acquired, the above-mentioned problems which the conventional type digital image pickup devices have can be solved.

Even if browse restriction information showing that browse restriction is applied is acquired in the digital image pickup device, browse restriction information showing that no browse restriction is applied may also be acquired by accounting between the digital image pickup device and the rights information server.

In this embodiment, the photography position information detector detects the positional information of the photographer, this is transmitted to the rights information server, and it is inquired whether browse restriction is applied or not based upon the corresponding photography position information, however, the photography position information detector detects positional information of an object and the rights information server may also be inquired based upon the positional information of the object. The positional information of the object can be detected by detecting distance from the object using a focusing function (not shown) provided to the digital image pickup device and by using an inclination sensor (not shown) function of a camera and an angle of view which is a characteristic of a lens.

Besides, in this embodiment, the cipher system adopts encryption based upon fixed information in browse restriction information showing that browse restriction is applied. However, in a browse restriction determination table shown in FIG. 6, when the detected positional information of a photographer is "b°,b',b.y":B°,B',B.y"', encryption is made using "b°,b',b":B°,B',B"" in which the positional information of the photographer is included and when the detected positional information of an object is "c°,c',c.z":C°,C',C.y"', encryption is made using "c°,c',c":C°,C',C"" in which the positional information of the object is included. That is, when positional information that browse restriction is applied is detected, encryption is made according to a cipher system defined in the browse restriction determination table.

Besides, in this embodiment, it is inquired whether browse restriction information is acquired or not before photographing an image digitally. However, it may also be inquired whether browse restriction information is acquired or not at the same time as photographing or immediately after photographing. When no browse restriction information is input to the browse restriction applying unit and only a photographed digital image is input, a process for applying browse restriction to the digital image shall be executed.

Third Embodiment

Figure 7:
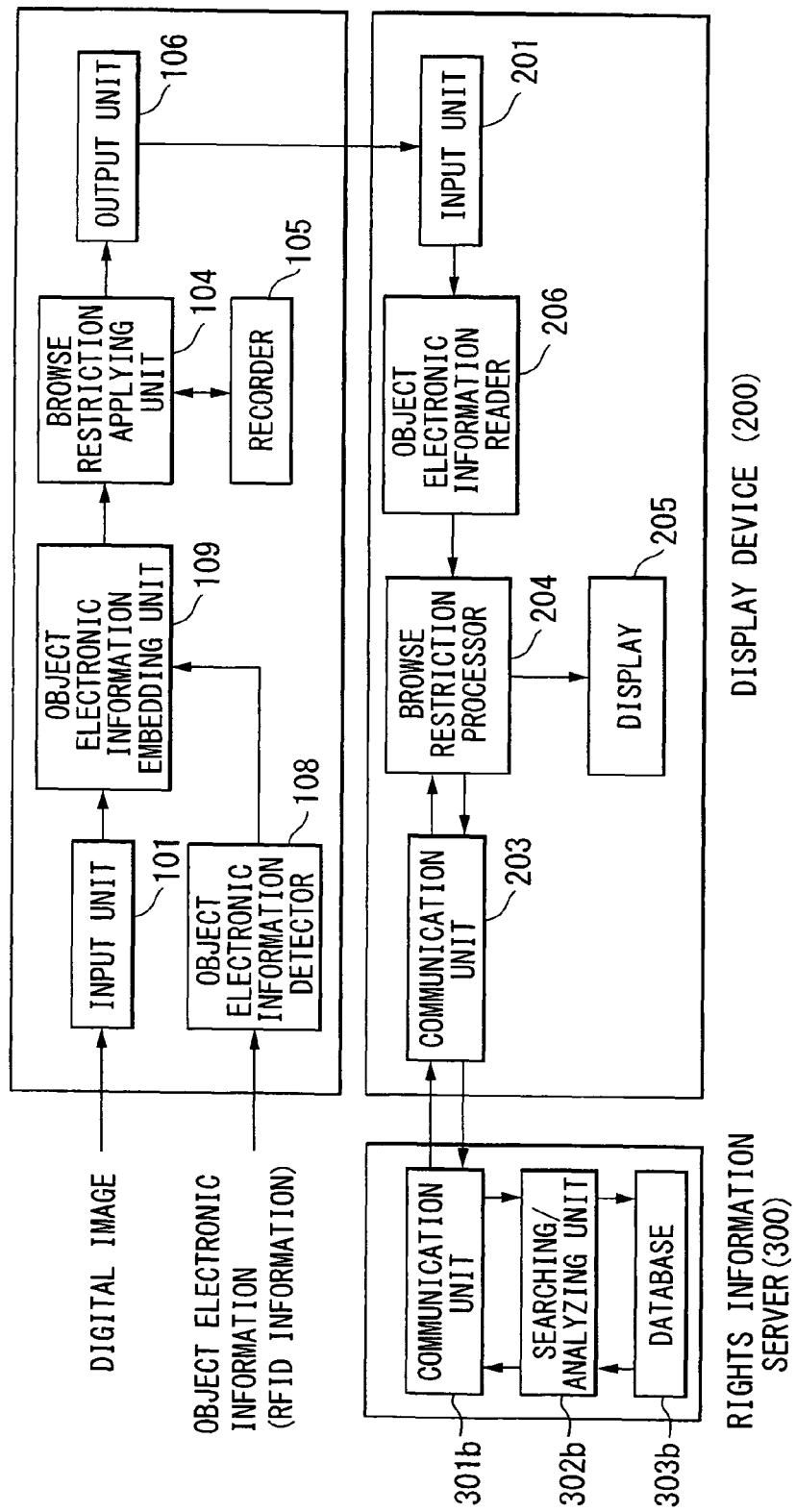
FIG. 7 shows the internal configuration of a digital image management system according to the invention and each block (a third embodiment)

Referring to FIGS. 7 to 9, a third embodiment of the invention will be described below. In this embodiment, the following ix explained: a process for detecting electronic information of an object, embedding this in the photographed digital image and applying browse restriction is executed in photographing an image digitally and a process for transmitting the electronic information of the object to a rights information server, inquiring whether the browse restriction can be released or not, acquiring browse restriction information which is the result of analysis from the rights information server and releasing the browse restriction according to the browse restriction information is executed in browsing. A digital image management system in this embodiment includes a digital image pickup device 100, a display device 200 and the rights information server 300.

The digital image pickup device 100 is provided with the input unit 101, an object electronic information detector 108, an object electronic information embedding unit 109, the browse restriction applying unit 104, the recorder 105 and the output unit 106. The display device 200 is provided with the input unit 201, an object electronic information reader 206, the communication unit 203, the browse restriction processor 204 and the display 205. The rights information server 300 is provided with a communication unit 301b, a searching/analyzing unit 302b and a database 303b.

The operation of the digital image management system will be described below. First, when a photographer takes a picture by the digital image pickup device 100 (S601), the photographed digital image is input to the input unit 101 (S602) and the object electronic information detector 108 detects electronic information of the object by detecting or receiving ID proper to the object and recorded in an RFID tag provided to the object (S603). To detect or receive it, a radio frequency identification (RFID) reader is used. Next, the photographed digital image and the detected electronic information of the object are input to the object electronic information embedding unit 109 and the electronic information of the object is embedded in the digital image (S604). Embedding the electronic information in the digital image prevents falsification by a user, and digital watermarking is utilized to guarantee the reliability of the embedded electronic information. The reliability of the embedded electronic information of the object is guaranteed by a digital signature function not shown. The digital image in which the electronic information of the object is embedded is input to the browse restriction applying unit 104 and the browse restriction applying unit 104 applies browse restriction by applying an encryption process such as a mosaic, shading and cutting to the whole or a part of the digital image in which the electronic information of the object is embedded (S605). A cipher system has only to be able to restore the original photographed image by a key and is not particularly limited. In this embodiment, digital watermarking is utilized. The cipher system has a mode in which encryption is made based upon fixed information and a mode in which encryption is made based upon detected electronic information of an object and these depend upon a mode for operating the system. In this embodiment, the mode based upon fixed information is adopted and an encryption process is executed using fixed information. Afterward, the digital image to which browse restriction is applied is output to the recorder 105 and the output unit 106 (S606). The recorder 105 has a built-in type and a detachable type. The output unit 106 outputs the digital image to the display device 200 and when the digital image is output, the output unit 106 and the display device 200 are connected via wire or by radio.

When the image photographed by the digital image pickup device 100 is displayed, the digital image to which browse restriction is applied is input from the output unit 106 to the input unit 201 of the display device 200 (S607). When the digital image to which browse restriction is applied is recorded in the detachable recorder 105, it is directly input to the input unit 201. Next, the digital image input to the input unit 201 is input to the object electronic information reader 206 and the object electronic information reader 206 reads the electronic information of the object embedded by the digital image pickup device 100 (S608). In this embodiment, the electronic information of the object is read using digital watermarking reading software and others. The digital image to which browse restriction is applied is input to the browse restriction processor 204 together with the read electronic information of the object, the browse restriction processor 204 once holds the image (S609), and in the meantime, transmits the electronic information of the object to the communication unit 203. The communication unit 203 communicates with the rights information server 300, transmits the electronic information of the object, and inquires whether browse restriction can be released or not (S610).

The communication unit 301*b* of the rights information server 300 acquires the electronic information of the object and transmits this to the searching/analyzing unit 302*b*. The searching/analyzing unit 302*b* searches whether browse restriction can be moved or not based upon the input electronic information of the object referring to a browse restriction determination table managed in the database 303*b*, acquires browse restriction information which is the result of analysis, and transmits this to the communication unit 301*b*. It is premised that the browse restriction determination table managed in the database 303*b* is highly reliable. As shown in FIG. 9, the browse restriction determination table manages electronic information of an object and rights information of whether browse restriction can be released or not with both information related and also manages a decoding key that can release browse restriction with the decoding key related to the electronic information of the object denoting the approval of a browse. For example, when this system adopts the mode in which encryption is made based upon fixed information, the digital image pickup device 100 executes an encryption process using fixed information. As the same "X11" as the electronic information exists in the browse restriction determination table when the electronic information of the object input to the searching/analyzing unit 302*b* is "X11", it is analyzed that rights information corresponding to the electronic information denotes the approval of a browse, browse restriction information showing that browse restriction can be released is acquired, the decoding key generated based upon fixed information managed with the fixed information related to the decoding key is acquired, and these are input to the communication unit 301*b*. In the meantime, since the same electronic information does not exist in the browse restriction determination table when the electronic information of the object input to the searching/analyzing unit 302*b* is "X12", it is analyzed that rights information corresponding to the electronic information denotes the disapproval of a browse, browse restriction information showing that browse restriction cannot be released is acquired, and this is input to the communication unit 301*b*. In this case, the decoding key cannot be acquired.

Afterward, the communication unit 301*b* transmits the browse restriction information to the communication unit 203 of the display device 200 (S611) and the communication unit 203 transmits this to the browse restriction processor 204. The browse restriction processor 204 applies a process for releasing browse restriction to the digital image to which browse restriction is applied and which is once held according to the input browse restriction information and displays the image on the display 205 after the process. That is, when browse restriction information showing that browse restriction can be released is input, the browse restriction processor executes the process for releasing browse restriction using the decoding key input together with the corresponding information (S612→S613) and displays the photographed digital image on the display 205 after the process (S614). In the meantime, when browse restriction information showing that browse restriction cannot be released is input, browse restriction is not released and the digital image to which browse restriction is applied is displayed on the display 205 (S612→S614).

According to this embodiment, the process for detecting the electronic information of the object, embedding this in the photographed digital image and applying browse restriction is executed in photographing and the process for transmitting the electronic information of the object to the rights information server, inquiring whether browse restriction can be released or not, acquiring browse restriction information which is the result of analysis from the rights information server and releasing the browse restriction according to the browse restriction information is executed in browsing. Thus, the photographed digital image can be browsed only when the information that can release the browse restriction is acquired and the above-mentioned problems which the conventional type digital image pickup devices have can be solved.

Even if information that cannot release browse restriction is acquired, the decoding key that can release the browse restriction may also be acquired by accounting between the display device and the rights information server 300.

In this embodiment, the encryption process is executed using fixed information, however, it is different depending upon a mode for operating the system and there is also a mode using the electronic information of the object. In the mode using the electronic information of the object, browse restriction is applied by encrypting using the detected electronic information of the object and in the meantime, the browse restriction determination table managed by the rights information server manages the decoding key generated using the electronic information of the object denoting the approval of a browse.

Fourth Embodiment

Figure 10:
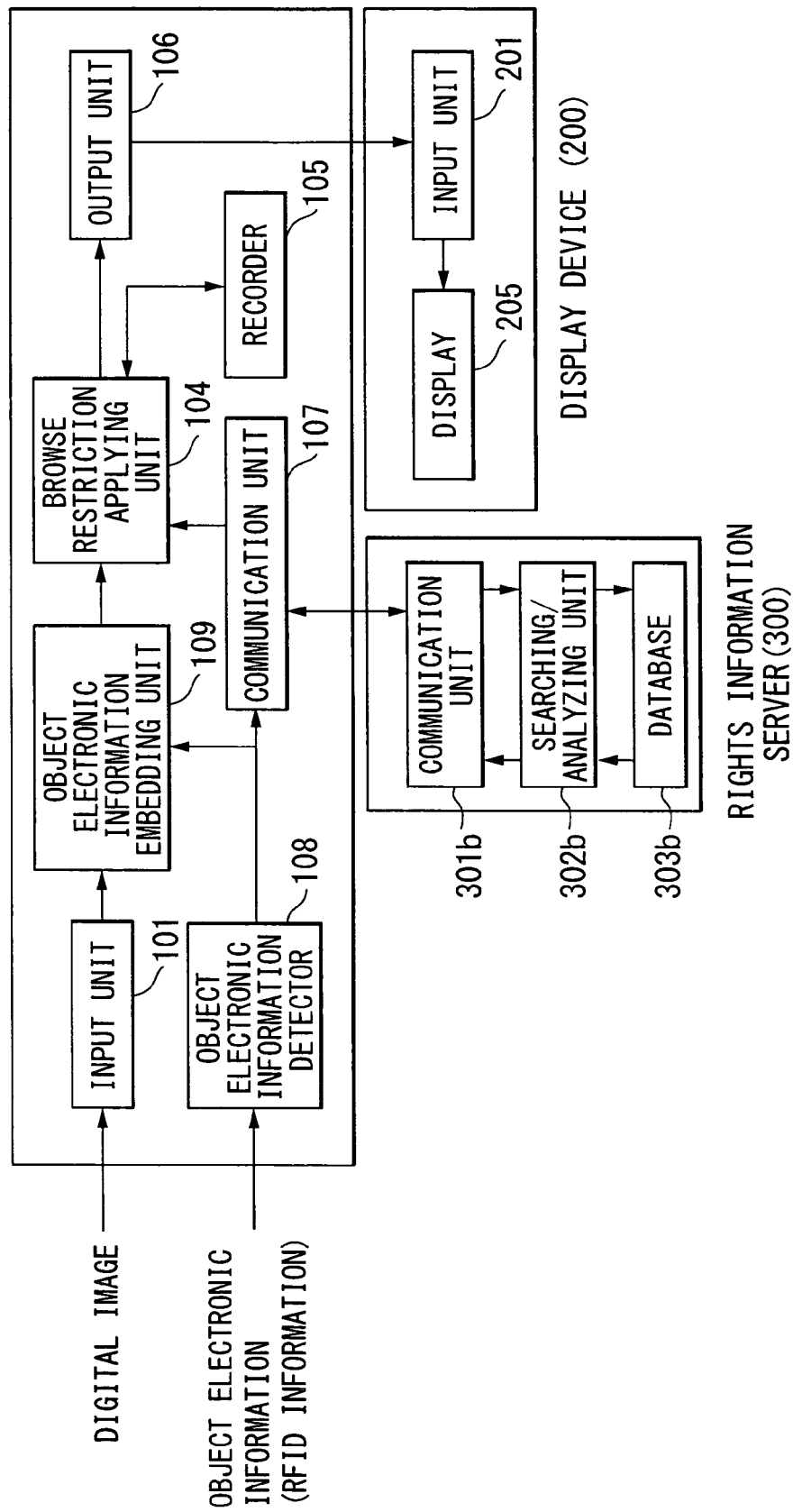
FIG. 10 shows the internal configuration of a digital image management system according to the invention and each block (a fourth embodiment)
Figure 11:
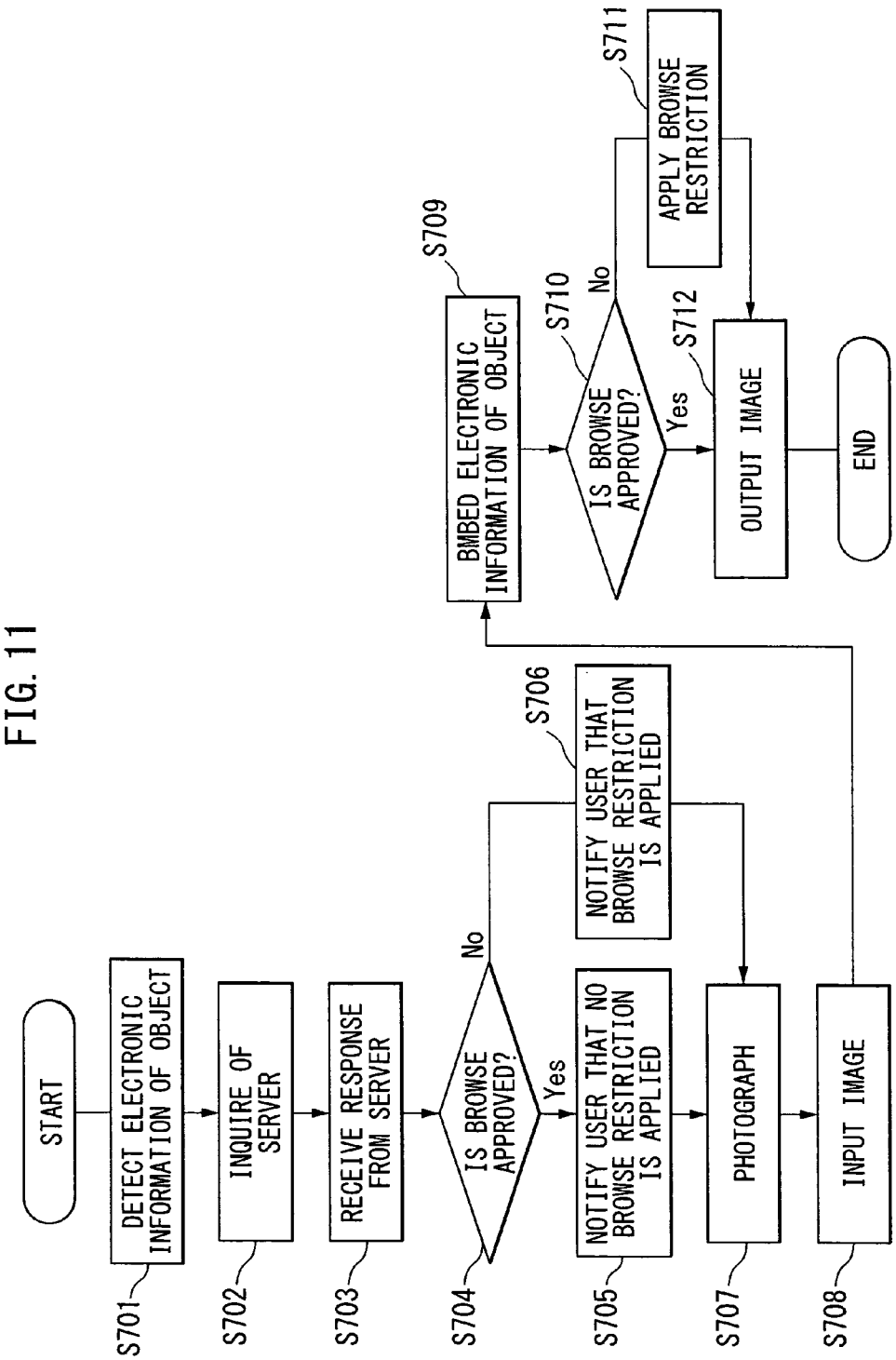
FIG. 11 shows a flow of a process in the digital image management system according to the invention (the fourth embodiment)

Referring to FIGS. 10 to 12, a fourth embodiment of the invention will be described below. In this embodiment, a process for detecting electronic information of an object, transmitting this to a rights information server, inquiring whether or not browse restriction is applied to a digital image in which the object is photographed, acquiring browse restriction information which is the result of analysis from the rights information server and applying browse restriction according to the browse restriction information is executed before photographing the image digitally. A digital image management system in this embodiment includes a digital image pickup device 100, a display device 200 and the rights information server 300.

The digital image pickup device 100 is provided with the input unit 101, an object electronic information detector 108, an object electronic information embedding unit 109, the browse restriction applying unit 104, the recorder 105, the output unit 106 and a communication unit 107. The display device 200 is provided with the input unit 201 and the display 205. The rights information server 300 is provided with a communication unit 301*b*, a searching/analyzing unit 302*b* and a database 303*b*.

The operation of the digital image management system will be described below. First, according to the operation of a photographer, the object electronic information detector 108 detects electronic information of an object by detecting or receiving ID recorded in an RFID tag provided to the object and proper to the object (S701). A radio frequency identification (RFID) reader is used for detecting or receiving this. The detected electronic information of the object is transmitted to the communication unit 107, the communication unit 107 communicates with the rights information server 300, transmits the electronic information of the object, and inquires whether browse restriction is applied or not (S702). The communication unit 301*b* of the rights information server 300 acquires the electronic information of the object and transmits this to the searching/analyzing unit 302*b*. The searching/analyzing unit 302*b* searches whether browse restriction is applied or not based upon the input electronic information of the object referring to the browse restriction determination table managed in the database 303*b*, acquires browse restriction information which is the result of analysis, and transmits the browse restriction information to the communication unit 301*b*. For example, since "X11" which is the same corresponding electronic information exists in the browse restriction determination table shown in FIG. 12 when the electronic information of the object input to the searching/analyzing unit 302*b* is "X11", it is analyzed that rights information corresponding to the electronic information denotes the disapproval of a browse, browse restriction information showing that browse restriction is applied is acquired, a cipher system showing that encryption is made based upon fixed information managed with the fixed information related to the browse restriction information is acquired, and these are input to the communication unit 301*b*. It is premised that the browse restriction determination table managed in the database 303*b* is highly reliable. The cipher system has only to be able to restore the original photographed image by a key and is not particularly limited. In this embodiment, digital watermarking is utilized. A cipher system has a mode in which encryption is made based upon fixed information and a mode in which encryption is made based upon detected electronic information of an object and a cipher system defined in the browse restriction determination table is adopted. In the meantime, as the same as the corresponding electronic information does not exist in the browse restriction determination table when the electronic information of the object input to the searching/analyzing unit 302*b* is "X12", it is analyzed that rights information corresponding to the electronic information denotes the approval of a browse, browse restriction information showing that no browse restriction is applied is acquired, and this is input to the communication unit 301*b*. In this case, no cipher system is acquired.

Afterward, the communication unit 301*b* transmits the browse restriction information to the communication unit 107 (S703) and the communication unit 107 transmits this to the browse restriction applying unit 104. The photographer can verify the browse restriction information acquired from the rights information server 300 and can verify that no browse restriction is applied (S704→S705) and that browse restriction is applied (S704→S706). The browse restriction applying unit 104 manages the electronic information of the object detected by the object electronic information detector 108 and the input browse restriction information with both information related.

Next, when the photographer takes a picture by the digital image pickup device 100 (S707), a photographed digital image is input to the input unit 101 (S708), the photographed digital image and the electronic information of the object detected in the step 701 are input to the object electronic information embedding unit 109, and the electronic information of the object is embedded in the digital image (S709). Embedding the electronic information in the digital image prevents falsification by a user, and digital watermarking is utilized for guaranteeing the reliability of the embedded electronic information. The reliability of the embedded electronic information of the object is guaranteed by a digital signature function not shown. The digital image in which the electronic information of the object is embedded is input to the browse restriction applying unit 104, the browse restriction applying unit 104 acquires browse restriction information managed with the browse restriction information related to the electronic information based upon the electronic information embedded in the digital image, and applies a process for applying browse restriction to the digital image according to the browse restriction information. That is, when browse restriction information showing that browse restriction is applied is input (S710→S711), browse restriction is applied by applying an encryption process such as a mosaic, shading and cutting to the whole or a part of the digital image according to a cipher system acquired together with the corresponding information. In the meantime, when browse restriction information showing that no browse restriction is applied is input, no encryption process is applied to the digital image. After the process for applying browse restriction is executed according to the browse restriction information, the digital image is output to the recorder 105 and the output unit 106 (S712). The recorder 105 has a built-in type and a detachable type. The output unit 106 outputs the digital image to the display device 200 and when the output unit outputs the digital image, the output unit 106 and the display device 200 are connected via wire or by radio. The digital image to which browse restriction is applied by the digital image pickup device 100 is input from the recorder 105 or the output unit 106 to the input unit 201 of the display device 200 and can be browsed by displaying the digital image on the display 105.

According to this embodiment, the process for detecting electronic information of an object, transmitting this to the rights information server, inquiring whether browse restriction is applied to the object or not, acquiring browse restriction information which is the result of analysis from the rights information server and applying browse restriction according to the browse restriction information is executed before photographing the image digitally, and browse restriction is applied to the photographed digital image when browse restriction information showing that browse restriction is applied is acquired. Thus, the above-mentioned problems which the conventional type digital image pickup devices have can be solved.

Even if browse restriction information showing that browse restriction is applied is acquired, browse restriction information showing that no browse restriction is applied may also be acquired by accounting between the digital image pickup device and the rights information server.

In this embodiment, the cipher system adopts encryption based upon fixed information managed with the fixed information related to browse restriction information showing that browse restriction is applied, however, when the detected electronic information of the object is "X22" or "X33", encryption using the electronic information of the object is defined in the browse restriction determination table shown in FIG. 12. That is, when the electronic information of the object showing that browse restriction is applied is detected, encryption is made according to a cipher system defined in the browse restriction determination table.

Besides, in this embodiment, it is inquired whether browse restriction information is acquired or not before photographing an image digitally. However, it may also be inquired whether browse restriction information is acquired or not at the same time as photographing or immediately after photographing. When no browse restriction information is input to the browse restriction applying unit and only the photographed digital image is input, a process for applying browse restriction to the digital image shall be executed.

Fifth Embodiment

Figure 14:
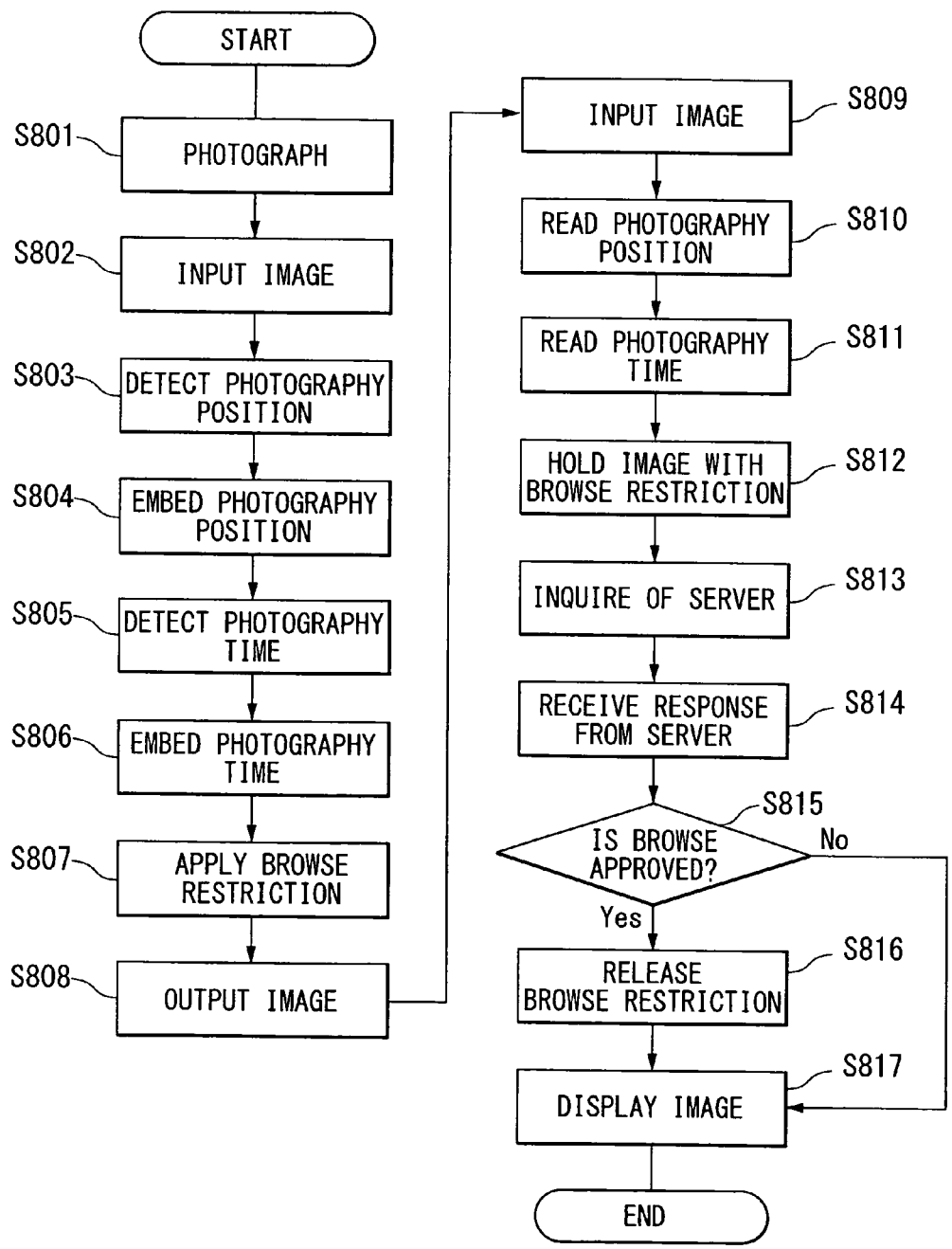
FIG. 14 shows a flow of a process in the digital image management system according to the invention (the fifth embodiment)

Referring to FIGS. 13 to 15, a fifth embodiment of the invention will be described below. In this embodiment, a process for detecting positional information of a photographer, acquiring Photography time information, embedding these in a photographed digital image and applying browse restriction is executed in photographing the image digitally, and a process for reading the positional information of the photographer and the Photography time information, transmitting these to a rights information server, inquiring whether browse restriction can be released or not, acquiring browse restriction information which is the result of analysis from the rights information server and releasing the browse restriction according to the browse restriction information is executed in browsing. A digital image management system in this embodiment includes a digital image pickup device 100, a display device 200 and the rights information server 300.

The digital image pickup device 100 is provided with the input unit 101, the photography position information detector 102, a Photography time acquiring unit 110, a photographic information embedding unit 111, the browse restriction applying unit 104, the recorder 105 and the output unit 106. The display device 200 is provided with the input unit 201, a photographic information reader 207, the communication unit 203, the browse restriction processor 204 and the display 205. The rights information server 300 is provided with a communication unit 301c, a searching/analyzing unit 302c and a database 303c.

The operation of the digital image management system will be described below. First, when a photographer takes a picture with the digital image pickup device 100 (S801), a photographed digital image is input to the input unit 101 (S802) and the photography position information detector 102 detects positional information of the photographer (S803). For the positional information of the photographer, global positioning system (GPS) information showing a position of the photographer by longitude and latitude is used and a GPS receiver is used for detecting the GPS information. The digital image and the detected positional information of the photographer are input to the photographic information embedding unit 111 and the photographic information embedding unit embeds the positional information of the photographer in the digital image (S804). Embedding the positional information in the digital image prevents falsification by a user, and digital watermarking is utilized for guaranteeing the reliability of the embedded positional information. The reliability of the embedded positional information is guaranteed by a digital signature function not shown. The Photography time acquiring unit 110 acquires time when the digital image is photographed (S805), the acquired time information is also input to the photographic information embedding unit 111, and the photographic information embedding unit also embeds the time information in the digital image (S806). Photography time is acquired when the photography position information detector 102 receives positioning waves radiated from plural GPS satellites and the time on the earth which is a received location can be acquired based upon the received waves. In place of GPS waves, a clock generating function (not shown) built in the digital image pickup device 100 may also be used and means for acquiring Photography time is not particularly limited. It is premised that acquired time is highly reliable. The digital image in which the positional information of the photographer and the Photography time information are embedded is input to the browse restriction applying unit 104 and the browse restriction applying unit 104 applies browse restriction by applying an encryption process such as a mosaic, shading and cutting to the whole or a part of the digital image (S807). A cipher system has only to be able to restore the original photographed image by a key and is not particularly limited. In this embodiment, digital watermarking is utilized. The cipher system has a mode in which encryption is made based upon fixed information and a mode in which encryption is made based upon detected positional information of a photographer and these depend upon a mode for operating the system. In this embodiment, the mode based upon fixed information is adopted and the encryption process is executed using fixed information. Then, the digital image to which browse restriction is applied is output to the recorder 105 and the output unit 106 (S808). There are a built-in type and a detachable type recorder 105. The output unit 106 outputs the digital image to the display device 200 and when the digital image is output, the output unit 106 and the display device 200 are connected via wire or by radio.

When the image photographed by the digital image pickup device 100 is displayed, the digital image to which browse restriction is applied is input from the output unit 106 to the input unit 201 of the display device 200 (S809). When the digital image to which browse restriction is applied is recorded in the detachable recorder 105, the digital image is directly input to the input unit 201. Next, the digital image input to the input unit 201 is input to the photographic information reader 207 and the photographic information reader 207 reads the positional information of the photographer and the Photography time information respectively embedded by the digital image pickup device 100 (S810, S811). In this embodiment, digital watermarking reading software is used for reading the photographic information. The digital image to which browse restriction is applied is input to the browse restriction processor 204 together with the read photographic information and the browse restriction processor 204 once holds the image (S812) and in the meantime, the photographic information is input to the communication unit 203. The communication unit 203 communicates with the rights information server 300, transmits the photographic information, and inquires whether browse restriction can be released or not (S813).

The communication unit 301c of the rights information server 300 acquires the positional information of the photographer and the Photography time information and transmits these to the searching/analyzing unit 302c. The searching/analyzing unit 302c searches whether browse restriction can be released or not based upon the input photographic information referring to a browse restriction determination table managed in the database 303c, acquires browse restriction information which is the result of analysis, and transmits this to the communication unit 301c. It is premised that the browse restriction determination table managed in the database 303c is highly reliable. As shown in FIG. 15, the browse restriction determination table manages a position, time information and rights information of whether browse restriction can be released or not with these items related to each other and also manages a decoding key that can release browse restriction with the decoding key related to the position and the time information that respectively permit a browse. For example, when this system adopts a mode in which encryption is made based upon fixed information, the digital image pickup device 100 executes an encryption process using fixed information. Since "a°,a',a":A°,A',A" (OO dome)" and "10:00~16:00" including the corresponding position and the corresponding time information exist in the browse restriction determination table when a position of the photographer and time information respectively input to the searching/analyzing unit 302c are "a°,a',a.x":A°,A',A.x"" and "12:30", it is analyzed that rights information corresponding to the corresponding photographic information denotes the approval of a browse, browse restriction information showing that browse restriction can be released is acquired, the decoding key generated based upon fixed information managed with the decoding key related to the browse restriction information is acquired, and these are input to the communication unit 301c. In the meantime, since no time information is included in the browse restriction determination table though the corresponding positional information is included when the position of the photographer and time information input to the searching/analyzing unit 302c are "a°,a',a.x":A°,A',A.x""and "17:30", it is analyzed that rights information corresponding to the corresponding photographic information denotes the disapproval of a browse, browse restriction information showing that browse restriction cannot be released is acquired, and this is input to the communication unit 301c. In this case, no decoding key can be acquired.

Afterward, the communication unit 301c transmits the browse restriction information to the communication unit 203 (S814) and the communication unit 203 transmits this to the browse restriction processor 204. The browse restriction processor 204 applies a process for releasing browse restriction to the digital image to which browse restriction is applied and which is once held according to the input browse restriction information and displays the image on the display 205 after the process. That is, when browse restriction information showing that browse restriction can be released is input, the process for releasing browse restriction is executed using the decoding key input together with the corresponding information (S815→S816) and the photographed digital image is displayed on the display 205 after the process (S817). In the meantime, when browse restriction information showing that browse restriction cannot be released is input, browse restriction is not released and the digital image to which browse restriction is applied is displayed on the display 205 (S815→S817).

According to this embodiment, the process for detecting positional information of a photographer and time information, embedding these in a photographed digital image and applying browse restriction is executed in photographing the image digitally and the process for transmitting the corresponding photographic information to the rights information server, inquiring whether browse restriction can be released or not, acquiring browse restriction information which is the result of analysis from the rights information server and releasing browse restriction according to the browse restriction information is executed in browsing. That is, Photography time information is added to a condition of browse restriction in addition to positional information, a browse restriction process specifying an event is enabled, and the above-mentioned problems which the conventional type digital image pickup devices have can be solved.

Even if information showing that browse restriction can be released is acquired, the decoding key that can release browse restriction may also be acquired by accounting between the display device and the rights information server.

In this embodiment, the photography position information detector detects positional information of a photographer, this is embedded in a digital image, and the rights information server is inquired of the positional information of the photographer. However, it may also be arranged such that the photography position information detector detects positional information of an object, this is embedded in the digital image, and the rights information server is inquired of the positional information of the object. The positional information of the object can be detected by detecting distance from the object using a focusing function (not shown) provided to the digital image pickup device and by using an inclination sensor (not shown) function of a camera and an angle of view which is a characteristic of a lens.

Besides, in this embodiment, the encryption process is executed using fixed information. However, this process is different depending upon a mode for operating the system, and there are also modes using positional information of a photographer and positional information of an object or using either of them and time information together. In the mode using positional information of a photographer, browse restriction is applied by encrypting using the positional information of the photographer and in the meantime, the browse restriction determination table managed by the rights information server manages a decoding key generated using positional information denoting the approval of a browse. In the mode using positional information of an object, browse restriction is applied by encrypting using the positional information of the object and in the meantime, the browse restriction determination table managed by the rights information server manages a decoding key generated using the positional information denoting the approval of a browse.

Besides, in this embodiment, the detected positional information of the photographer and the detected time information are transmitted to the rights information server and it is inquired whether browse restriction can be released or not. However, it may also be arranged such that electronic information of an object and time information are detected, these are transmitted to the rights information server, and it is inquired whether browse restriction can be released or not. In this mode, the similar effect to the effect acquired in this embodiment is also acquired and the above-mentioned problems which the conventional type digital image pickup devices have can be solved.

Sixth Embodiment

Figure 16:
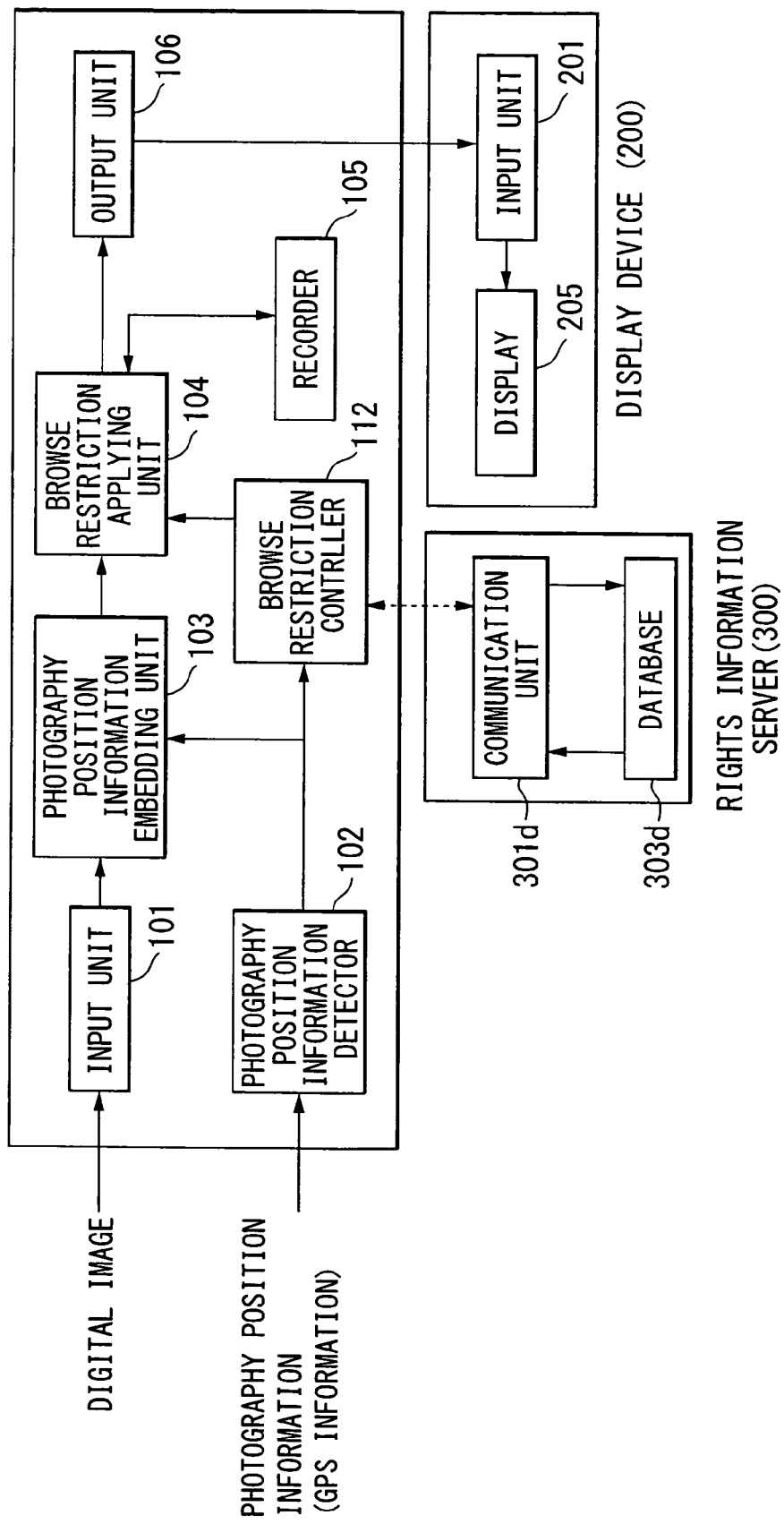
FIG. 16 shows the internal configuration of a digital image management system according to the invention and each block (a sixth embodiment)
Figure 17:
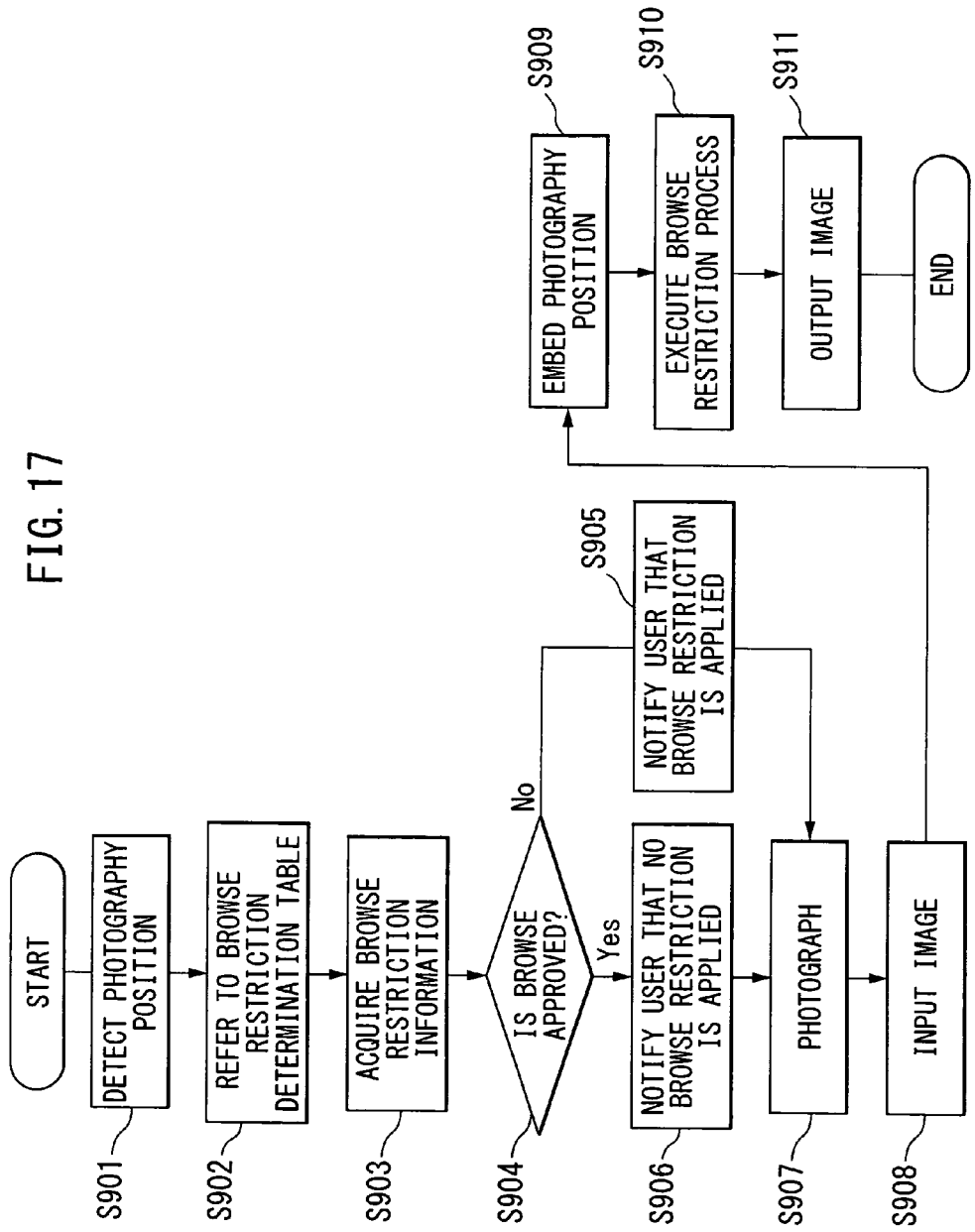
FIG. 17 shows a flow of a process in the digital image management system according to the invention (the sixth embodiment)

Referring to FIGS. 16 to 18, a sixth embodiment of the invention will be described below. In this embodiment, a browse restriction determination table managed by the rights information server 300 in the first to fifth embodiments is managed by a digital image pickup device 100, browse restriction information is acquired in the digital image pickup device, and a process for applying browse restriction is executed according to the browse restriction information. A digital image management system in this embodiment includes the digital image pickup device 100, a display device 200 and a rights information server 300.

The digital image pickup device 100 is provided with the input unit 101, the photography position information detector 102, the photography position information embedding unit 103, the browse restriction applying unit 104, the recorder 105, the output unit 106 and a browse restriction controller 112. The display device 200 is provided with the input unit 201 and the display 205. The rights information server 300 is provided with a communication unit 301*d* and a database 303*d*.

The operation of the digital image management system will be described below. First, the photography position information detector 102 detects positional information of a photographer according to the operation of the photographer (S901). For the positional information of the photographer, global positioning system (GPS) information showing a position of the photographer by longitude and latitude is used and a GPS receiver is used for detecting the GPS information. The detected positional information of the photographer is input to the browse restriction controller 114, the browse restriction controller 114 analyzes whether or not browse restriction is applied to the positional information of the photographer referring the browse restriction determination table periodically acquired from the rights information server 300 and managed (S902) and acquires browse restriction information which is the result of analysis (S903). It is premised that the browse restriction determination table is highly reliable. As shown in FIG. 18, the browse restriction determination table manages positional information and rights information of whether browse restriction is applied or not with both information related and also manages information showing a cipher system for encryption and information showing an encryption level with both information related to positional information denoting the application of browse restriction. The encryption level shows the intensity of encryption when a browse restriction process is executed. The higher a numeric value of encryption intensity is, the more the quantity of encryption is. When the numeric value of encryption intensity is '0', no encryption is made. An encryption process such as a mosaic, shading and cutting is applied to the whole or a part of an image according to a cipher system and encryption intensity respectively defined in the browse restriction determination table. For example, as "a°,a',a":A°,A',A" (OO dome)" including the corresponding positional information exists in the browse restriction determination table shown in FIG. 18 when detected positional information of a photographer is "a°,a',a.x":A°,A',A.x"", it is analyzed that rights information corresponding to the corresponding positional information denotes the disapproval of a browse, further, a cipher system adopts a mode using fixed information and encryption intensity is '1', and browse restriction information including these is acquired.

The browse restriction information acquired by the browse restriction controller 114 is input to the browse restriction applying unit 104. The photographer can verify the browse restriction information and can verify that no browse restriction is applied (S904→S906) and that browse restriction is applied (S904→S905). The browse restriction applying unit 104 manages the positional information of the photographer detected by the photography position information detector 102 and the input browse restriction information with both information related.

Next, when the photographer takes a picture by the digital image pickup device 100 (S907), a photographed digital image is input to the input unit 101 (S908), the photography position information embedding unit 103 inputs the photographed digital image and the positional information of the photographer detected in the step 901, and embeds the positional information of the photographer in the digital image (S909). Embedding positional information in a digital image prevents falsification by a user and digital watermarking is utilized for guaranteeing the reliability of the embedded positional information. The reliability of the embedded positional information is guaranteed by a digital signature function not shown. The digital image in which the positional information of the photographer is embedded is input to the browse restriction applying unit 104, the browse restriction applying unit 104 acquires browse restriction information managed with the browse restriction information related to the positional information based upon the positional information embedded in the digital image, and applies a process for applying browse restriction to the digital image according to the browse restriction information. That is, the browse restriction applying unit executes the process for applying browse restriction according to a cipher system and encryption intensity respectively defined in the browse restriction information acquired in the step 903 (S910). After the process for applying browse restriction is executed according to the browse restriction information, the digital image is output to the recorder 105 and the output unit 106 (S911). The recorder 105 has a built-in type and a detachable type. The output unit 106 outputs the digital image to the display device 200 and when the digital image is output, the output unit 106 and the display device 200 are connected via wire or by radio. The digital image to which browse restriction is applied by the digital image pickup device 100 is input from the recorder 105 or the output unit 106 to the input unit 201 of the display device 200 and can be browsed by displaying the digital image on the display 205.

According to this embodiment, the digital image pickup device manages the browse restriction determination table periodically acquired from the rights information server, acquires browse restriction information based upon information detected in the device and executes the process for applying browse restriction according to the browse restriction information. Thus, the browse restriction process according to the browse restriction information can be applied to a photographed digital image without inquiring the rights information server and the above-mentioned problems which the conventional type digital image pickup devices have can be solved.

Even if browse restriction information showing that browse restriction is applied is acquired, browse restriction information showing that no browse restriction is applied may also be acquired by accounting between the digital image pickup device and the rights information server.

In this embodiment, the mode in which the positional information of the photographer is detected is described, however, there are also modes in which positional information of an object and electronic information of the object are detected, and there is also a mode in which either of these and time information are detected together.

Further, in this embodiment, the encryption level is managed in the browse restriction determination table together and browse restriction can be applied to a digital image acquired by photographing a place and a thing of which the photography is respectively prohibited according to the importance of them.

Further, in this embodiment, the mode in which browse restriction information is acquired before photographing an image digitally is described. However, browse restriction information is acquired at the same time as photographing or immediately after photographing and the browse restriction process according to the browse restriction information may also be executed. When no browse restriction information is input to the browse restriction applying unit and only a photographed digital image is input, a process for applying browse restriction to the digital image shall be executed.

Seventh Embodiment

Figure 19:
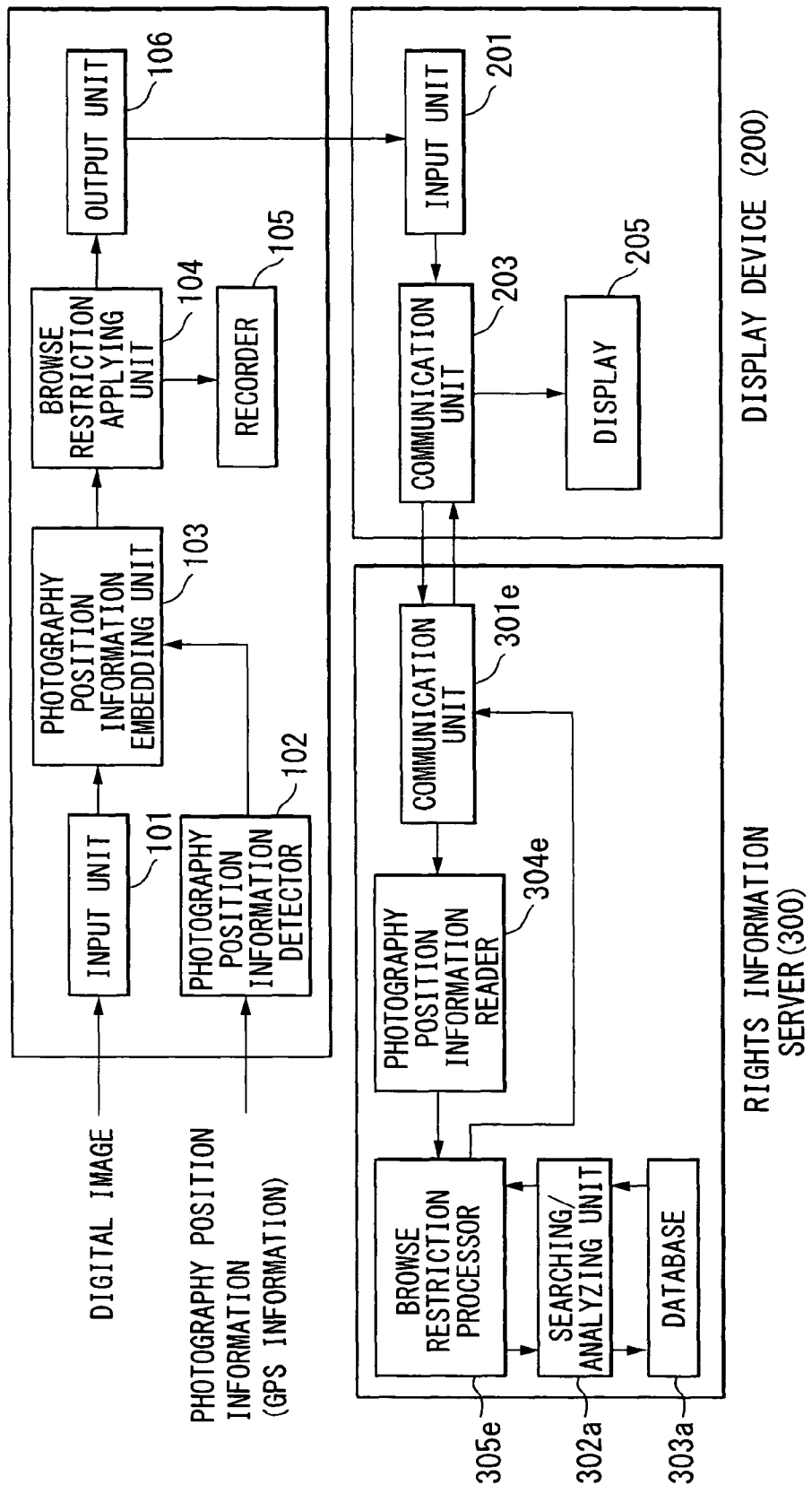
FIG. 19 shows the internal configuration of a digital image management system according to the invention and each block (a seventh embodiment)
Figure 20:
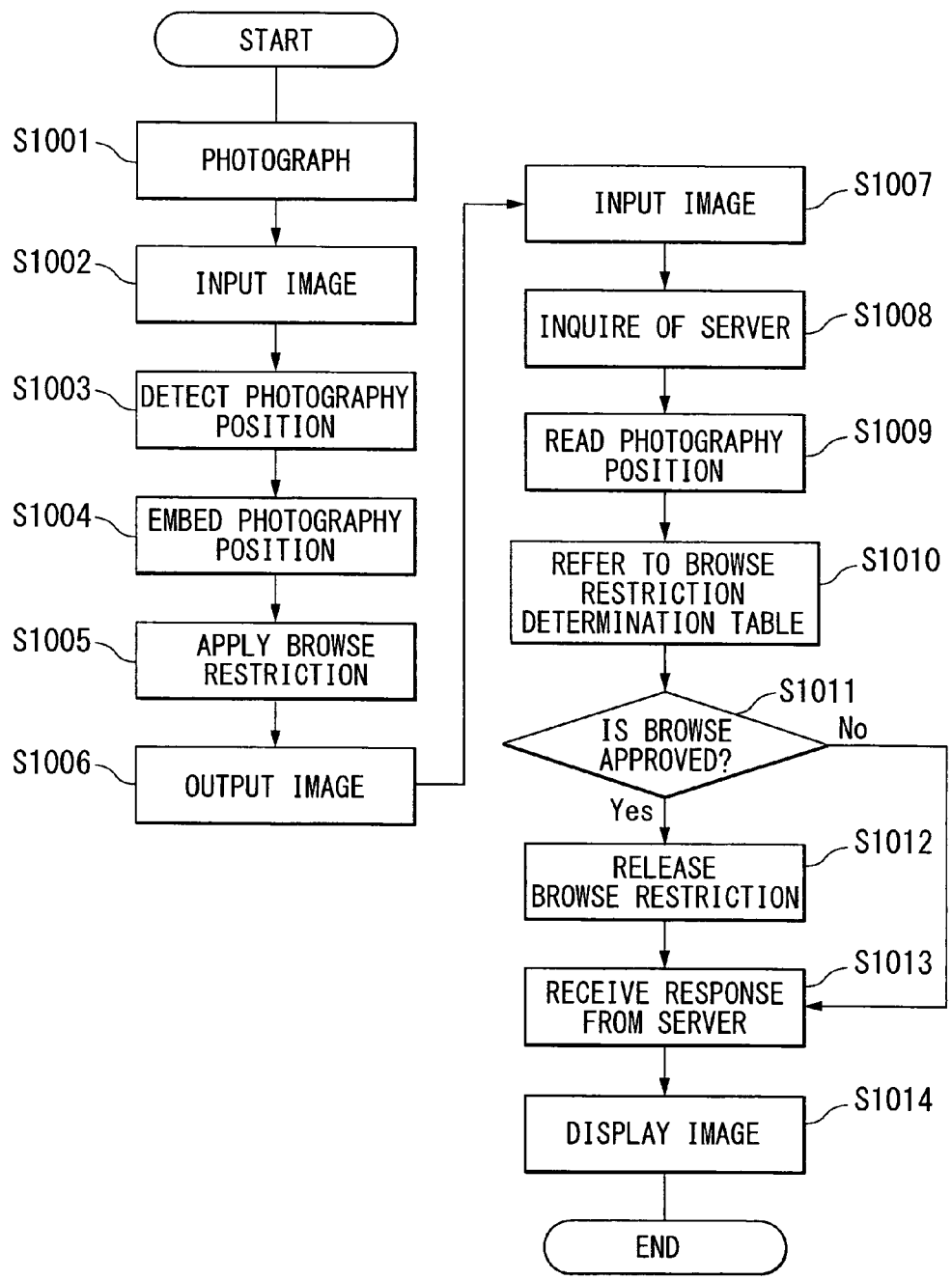
FIG. 20 shows a browse restriction determination table (the seventh embodiment).

Referring to FIGS. 19 and 20, a seventh embodiment of the invention will be described below. In this embodiment, a digital image to which browse restriction is applied is transmitted to a rights information server, the rights information server reads information embedded in the digital image, acquires browse restriction information based upon the embedded information, and executes a process for releasing browse restriction according to the browse restriction information. A digital image management system in this embodiment includes a digital image pickup device 100, a display device 200 and the rights information server 300.

The digital image pickup device 100 is provided with the input unit 101, the photography position information detector 102, the photography position information embedding unit 103, the browse restriction applying unit 104, the recorder 105 and the output unit 106. The display device 200 is provided with the input unit 201, the communication unit 203 and the display 205. The rights information server 300 is provided with a communication unit 301e, a searching/analyzing unit 302e, a database 303e, a photography position information reader 304e and a browse restriction processor 305e.

The operation of the digital image management system will be described below. First, when a photographer takes a picture by the digital image pickup device 100 (S1001), a photographed digital image is input to the input unit 101 (S1002) and the photography position information detector 102 detects positional information of the photographer (S1003). For positional information of a photographer, global positioning system (GPS) information showing a position of the photographer by longitude and latitude is used and a GPS receiver is used for detecting the GPS information. The digital image and the detected positional information of the photographer are input to the photography position information embedding unit 103, and the photography position information embedding unit 103 embeds the positional information of the photographer in the digital image (S1004). Embedding positional information in a digital image prevents falsification by a user and digital watermarking is utilized for guaranteeing the reliability of the embedded positional information. The reliability of the embedded positional information is guaranteed by a digital signature function not shown. The digital image in which the positional information of the photographer is embedded is input to the browse restriction applying unit 104 and the browse restriction applying unit 104 applies browse restriction by applying an encryption process such as a mosaic, shading and cutting to the whole or a part of the digital image (S1005). A cipher system has only to be able to restore the original photographed image by a key and is not particularly limited. In this embodiment, digital watermarking is utilized. The cipher system has a mode in which encryption is made based upon fixed information and a mode in which encryption is made based upon detected positional information of a photographer and these depend upon a mode for operating the system. In this embodiment, the mode using fixed information is adopted and an encryption process is executed using fixed information. Afterward, the digital image to which browse restriction is applied is output to the recorder 105 and the output unit 106 (S1006). The recorder 105 has a built-in type and a detachable type. The output unit 106 outputs the digital image to the display device 200 and the digital image is output, the output unit 106 and the display device 200 are connected via wire or by radio.

When the image photographed by the digital image pickup device 100 is displayed, the digital image to which browse restriction is applied is input to from the output unit 106 to the input unit 201 of the display device 200 (S1007). When the digital image to which browse restriction is applied is recorded in the detachable recorder 105, the digital image is directly input to the input unit 201. Next, the digital image input to the input unit 201 is input to the communication unit 203, the communication unit 203 communicates with the rights information server 300, transmits the digital image to which the browse restriction is applied, and inquires whether the browse restriction can be released or not (S1008).

The communication unit 301e of the rights information server 300 acquires the digital image to which the browse restriction is applied and transmits this to the photography position information reader 304e. The photography position information reader 304e reads the positional information of the photographer embedded by the digital image pickup device 100 (S1009). The digital image to which browse restriction is applied is input to the browse restriction processor 305e together with the read positional information of the photographer, the browse restriction processor 305e once holds the image, and in the meantime, transmits the positional information of the photographer to the searching/analyzing unit 302e. The searching/analyzing unit 302e searches whether browse restriction can be released or not based upon the input positional information of the photographer referring to the browse restriction determination table managed in the database 303e, acquires browse restriction information which is the result of analysis, and transmits this to the browse restriction processor 305e (S1010). It is premised that the browse restriction determination table managed in the database 303e is highly reliable. As shown in FIG. 3, the browse restriction determination table manages positional information and rights information of whether browse restriction can be released or not with both information related and also manages a decoding key that can release browse restriction with the decoding key related to positional information denoting the approval of a browse. For example, when this system adopts the mode in which encryption is made based upon fixed information, the digital image pickup device 100 executes the encryption process using fixed information. Since "a°,a',a":A°,A',A" (OO dome)" including the corresponding positional information exists in the browse restriction determination table when the positional information of the photographer input to the searching/analyzing unit 302e is "a°,a',a.x":A°,A',A.x'"", it is analyzed that rights information corresponding to the corresponding positional information denotes the approval of a browse, browse restriction information showing that browse restriction can be released is acquired, a decoding key generated based upon fixed information managed with the decoding key related to the browse restriction information is acquired, and these are input to the browse restriction processor 305e. In the meantime, as no information including the corresponding positional information exists in the browse restriction determination table when the positional information of the photographer input to the searching/analyzing unit 302e is "a°,a',b.x":A°,A',B.x'"", it is analyzed that rights information corresponding to the corresponding positional information denotes the disapproval of a browse, browse restriction information showing that browse restriction cannot be released is acquired, and this is input to the browse restriction processor 305e. In this case, no decoding key can be acquired.

Afterward, the browse restriction processor 305e executes a process for releasing the browse restriction of the digital image according to the acquired browse restriction information and the digital image to which the process is applied is transmitted to the display device 200 via the communication unit 301e. That is, when browse restriction information showing that browse restriction can be released is input to the browse restriction processor 305e, the browse restriction processor 305e executes a process for releasing browse restriction using the decoding key input together with the corresponding information (S1011→S1012) and the photographed digital image is transmitted to the communication unit 203 of the display device 200 via the communication unit 301e (S1013). In the meantime, when browse restriction information showing that browse restriction cannot be released is input, browse restriction is not released and the digital image to which browse restriction is applied is transmitted to the communication unit 203 of the display device 200 via the communication unit 301e (S1011→S1013). Then, the communication unit 203 transmits the input digital image to the display 205 and the input digital image is displayed on the display 205 as it is (S1014).

According to this embodiment, a digital image to which browse restriction is applied is transmitted the rights information server, the rights information server reads information embedded in the digital image, acquires browse restriction information based upon the embedded information and executes the process for releasing browse restriction from the digital image to which the browse restriction is applied according to the browse restriction information. Thus, the display device is not required to execute a process for releasing browse restriction.

Even if the rights information server cannot release browse restriction based upon the read information, browse restriction may also be released by accounting between the rights information server and the photographer.

In this embodiment, the mode using positional information of a photographer is described. However, there are also modes using positional information of an object and electronic information of the object or using either of these and time information together. In these modes, the similar effect to the effect acquired in this embodiment is also acquired and the above-mentioned problems which the conventional type digital image pickup devices have can be solved.

What is claimed is:

1. A digital image pickup device, comprising:
   an input unit that inputs a photographed digital image;
   a predetermined information detector that detects predetermined information;
   a predetermined information embedding unit that embeds the detected predetermined information in the digital image; and
   a browse restriction applying unit that inquires whether browse restriction is applied or not based upon the detected predetermined information and acquires browse restriction information which is a result of the inquiries, and executes a process for applying browse restriction to the digital image in which the predetermined information is embedded according to the browse restriction information acquired;
   wherein the browse restriction applying unit determines a quantity of a process for applying browse restriction according to encryption intensity defined in the browse restriction information.

2. The digital image pickup device according to claim 1, wherein the predetermined information is a position of a photographer or a position of an object.

3. The digital image pickup device according to claim 1, wherein the predetermined information is electronic information of an object.

4. The digital image pickup device according to claim 1, wherein the predetermined information includes Photography time information.

5. The digital image pickup device according to claim 1, comprising:
   a browse restriction controller that manages a browse restriction determination table for determining whether browse restriction is applied or not,
   wherein the browse restriction controller acquires the browse restriction information which is a result of the analysis of whether browse restriction is applied or not is acquired based upon the detected predetermined information using the browse restriction determination table; and
   the browse restriction applying unit executes a process for applying browse restriction according to the browse restriction information.

6. The digital image pickup device according to claim 1, wherein the browse restriction applying unit executes a process for applying browse restriction according to a cipher system defined in the browse restriction information.

7. The digital image pickup device according to claim 6, wherein the cipher system uses fixed information, positional information of a photographer, positional information of an object, electronic information of the object or any of such information and time information.

8. The digital image pickup device according to claim 1, wherein the browse restriction information is previously stored in the digital image pickup device or is acquired from the outside.

* * * * *